United States Patent
Saito et al.

(10) Patent No.: US 7,272,676 B2
(45) Date of Patent: Sep. 18, 2007

(54) DATA TRANSMISSION CONTROLLER THAT RESTARTS DATA TRANSMISSION WHEN RECONSTRUCTION IS COMPLETED

(75) Inventors: Nobuyuki Saito, Sapporo (JP); Yoshimi Oka, Kitahiroshima (JP); Kenyou Nagao, Sapporo (JP); Hironobu Kazama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 484 days.

(21) Appl. No.: 10/847,586

(22) Filed: May 18, 2004

(65) Prior Publication Data

US 2005/0010702 A1 Jan. 13, 2005

(30) Foreign Application Priority Data

May 20, 2003 (JP) ............... 2003-142194

(51) Int. Cl.
G06F 3/00 (2006.01)
G06F 5/00 (2006.01)
G06F 12/00 (2006.01)
G06F 13/00 (2006.01)
G06F 13/28 (2006.01)

(52) U.S. Cl. ............ 710/52; 710/36; 710/40; 711/167; 711/168; 711/169

(58) Field of Classification Search ............ 710/52; 711/154–169
See application file for complete search history.

(56) References Cited

U.S. PATENT DOCUMENTS 4,344,129 A * 8/1982 Asada et al. ............... 712/229

6,252,876 B1 * 6/2001 Brueckheimer et al. .... 370/394
6,317,815 B1 * 11/2001 Mayer et al. ............... 711/165
6,732,205 B2 5/2004 Kamihara et al.
2001/0042141 A1 * 11/2001 Matsunaga et al. ........... 710/1
2003/0229749 A1 12/2003 Saito et al.
2004/0017772 A1 1/2004 Saito et al.
2004/0037310 A1 2/2004 Saito et al.
2005/0005039 A1 1/2005 Saito

FOREIGN PATENT DOCUMENTS

| JP | A 05-158622 | 6/1993 |
|---|---|---|
| JP | A 06-095993 | 4/1994 |
| JP | A 06-274425 | 9/1994 |
| JP | A 07-175698 | 7/1995 |
| JP | A 09-326832 | 12/1997 |
| JP | A 2000-305825 | 11/2000 |
| JP | A 2001-184176 | 7/2001 |
| JP | A 2001-282711 | 10/2001 |

* cited by examiner

Primary Examiner—Christopher R. Tate
Assistant Examiner—Brooke Dews
(74) Attorney, Agent, or Firm—Oliff & Berridge, PLC

(57) ABSTRACT

A data transfer control device including: a buffer controller which allocates a plurality of pipe regions in a packet buffer and controls access to the packet buffer; and a transfer controller which controls data transfer between the pipe regions and corresponding endpoints. The transfer controller performs processing of pausing data transfer between the pipe regions and the endpoints, the buffer controller performs reconstruction processing which includes at least one of deletion, addition, and size change of the pipe regions after the completion of the pause processing, and then the transfer controller resumes the paused data transfer after the reconstruction processing of the pipe regions. Data in the pipe regions before the reconstruction processing is copied to the pipe regions after the reconstruction processing while preventing the data from being erased.

26 Claims, 23 Drawing Sheets

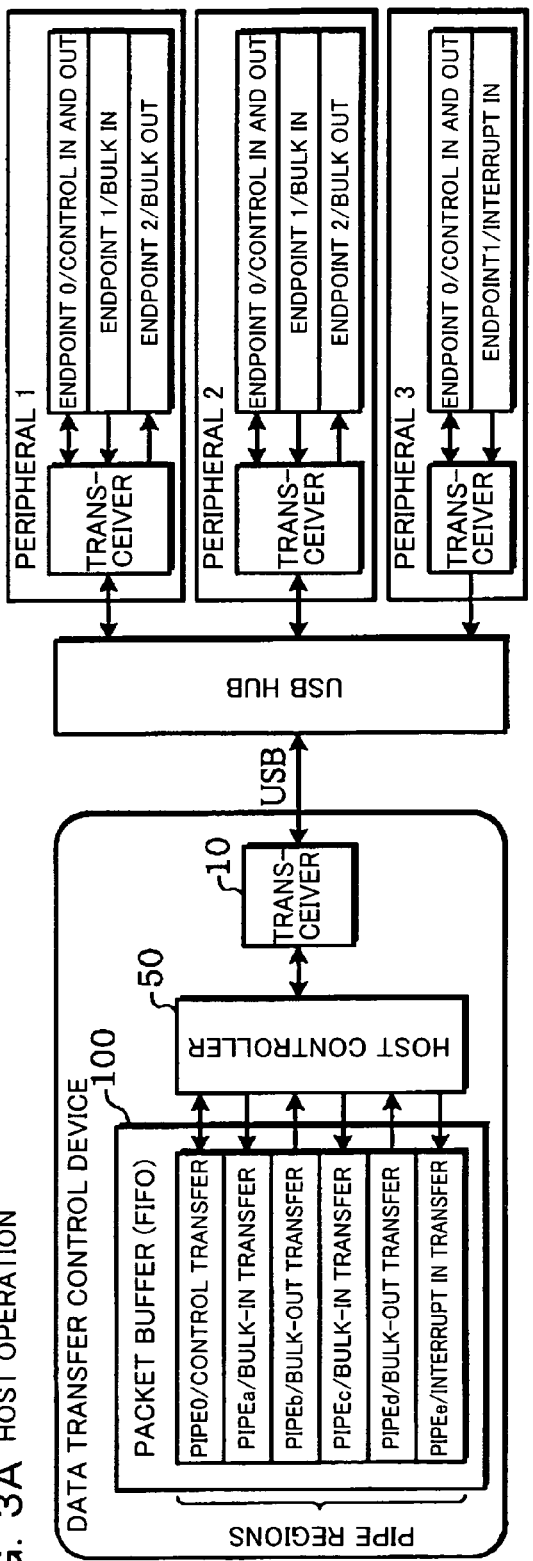
FIG. 3A  HOST OPERATION
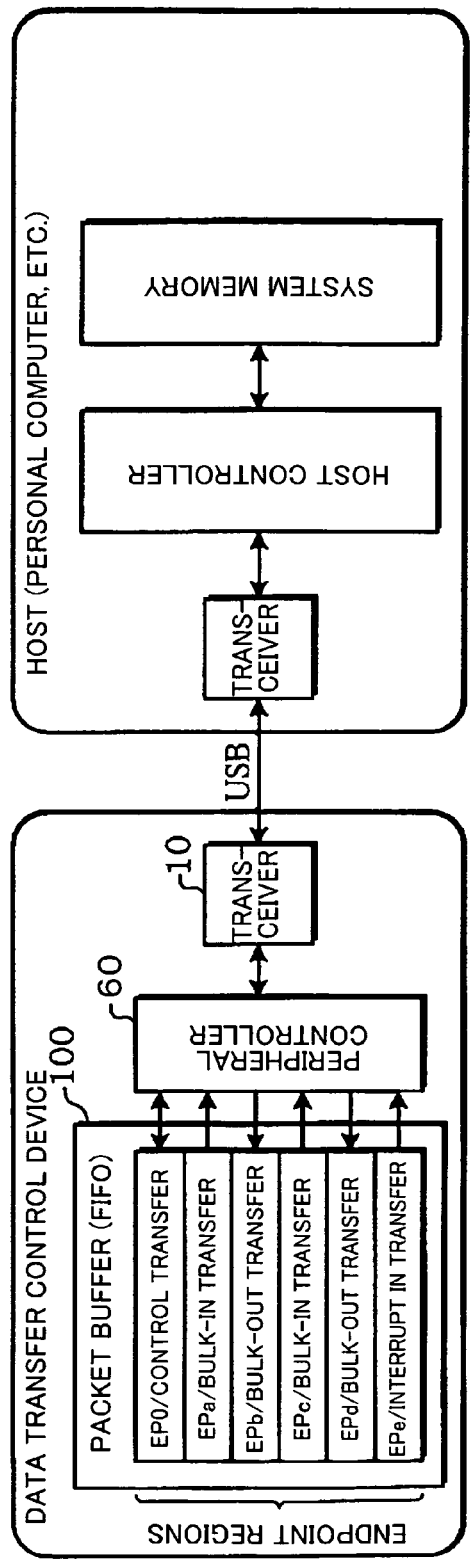
FIG. 3B  PERIPHERAL OPERATION

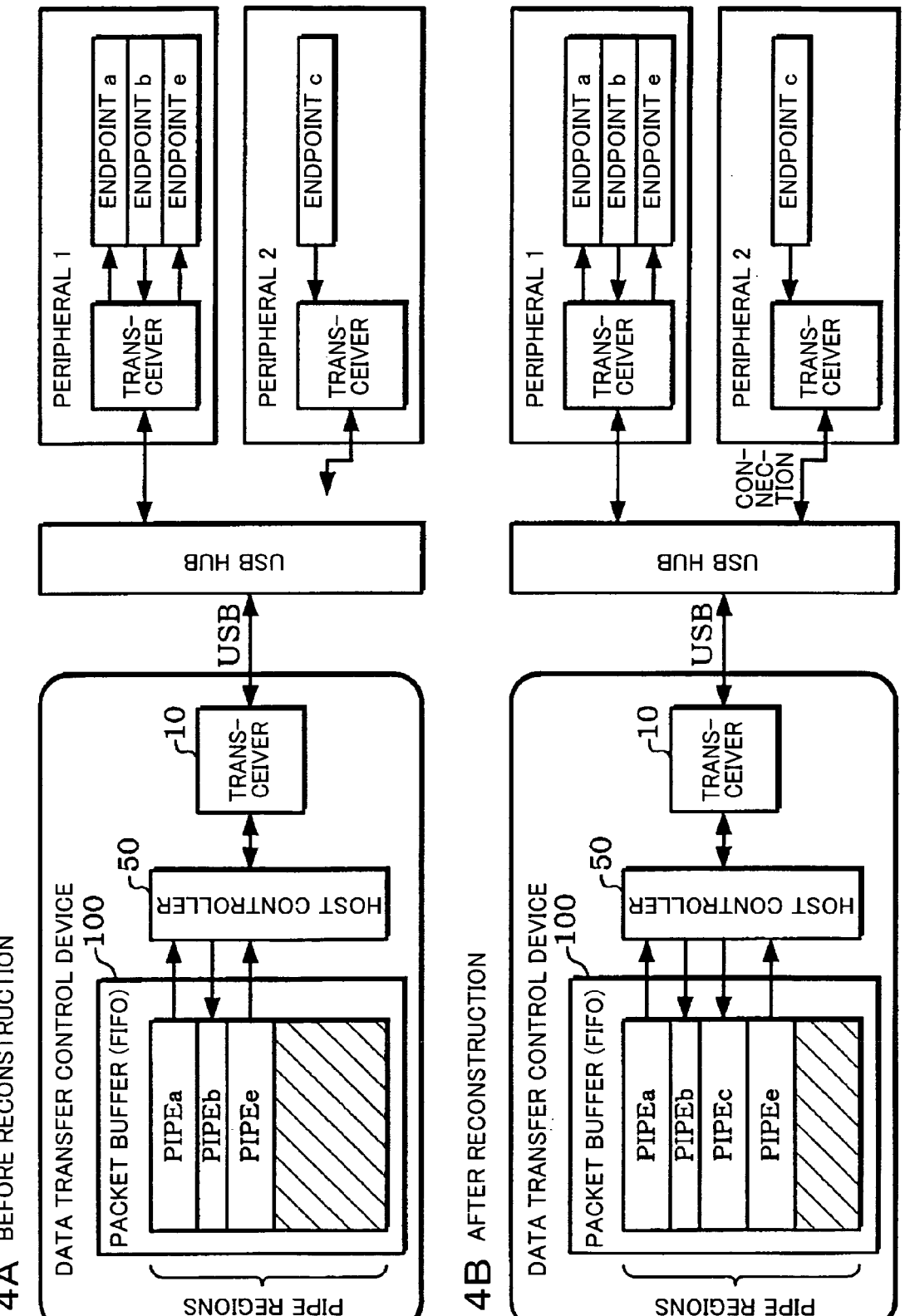
FIG. 4A BEFORE RECONSTRUCTION
FIG. 4B AFTER RECONSTRUCTION

FIG. 9B  TRANSMISSION (DMA OR CPU → PACKET BUFFER → USB)

|  | DMA TRANSFER | CPU TRANSFER |
| --- | --- | --- |
| WPtr | DMA | CPU |
| RPtr | USB | USB |

FIG. 9C  RECEPTION (USB → PACKET BUFFER → DMA OR CPU)

|  | DMA TRANSFER | CPU TRANSFER |
| --- | --- | --- |
| WPtr | USB | USB |
| RPtr | DMA | CPU |

FIG. 19

REGISTER SECTION

| | | | |
|---|---|---|---|
| TRANSFER CONDITION REGISTER (PIPE/EP CONTROL REGISTER) (0, a~e) | HC/PC (PIPE/EP) COMMON REGISTER | REGISTER USED COMMONLY DURING HOST OPERATION (PIPE) AND PERIPHERAL OPERATION (EP) | DATA TRANSFER DIRECTION, TRANSFER TYPE, ENDPOINT NUMBER, MAXIMUM PACKET SIZE, NUMBER OF PAGES, USE OF DMA CONNECTION, ETC. |
| | HC (PIPE) REGISTER | REGISTER USED ONLY DURING HOST OPERATION (PIPE) | TOKEN ISSUE INTERVAL FOR INTERRUPT TRANSFER, NUMBER OF CONTINUOUS EXECUTION TIMES OF TRANSACTIONS, FUNCTION ADDRESS, TOTAL SIZE OF TRANSFER DATA, START INSTRUCTION FOR AUTOMATIC TRANSACTION, INSTRUCTION FOR AUTOMATIC CONTROL TRANSFER MODE, ETC. |
| | PC (EP) REGISTER | REGISTER USED ONLY DURING PERIPHERAL OPERATION (EP) | ENDPOINT ENABLE, HANDSHAKE DESIGNATION, ETC. |
| | COMMON ACCESS CONTROL REGISTER FOR PACKET BUFFER (FIFO) | REGISTER FOR CONTROLLING ACCESS TO PACKET BUFFER (FIFO) | BUFFER I/O PORT, BUFFER FULL/EMPTY, BUFFER REMAINING DATA SIZE, ETC. |
| INTERRUPT-RELATED REGISTER | INTERRUPT STATUS REGISTER | REGISTER WHICH INDICATES STATUS (FACTOR) OF INTERRUPT | OTGC, HC (PIPE), PC (EP), ETC. |
| | INTERRUPT ENABLE REGISTER | REGISTER FOR SETTING ENABLING/DISABLING OF INTERRUPT | OTGC, HC (PIPE), PC (EP), ETC. |
| BLOCK-RELATED REGISTER | INTERBLOCK COMMON REGISTER | REGISTER USED COMMONLY BY BLOCKS | INSTRUCTION OF BLOCK RESET, ETC. |
| | BLOCK REGISTER | REGISTER USED IN EACH OF BLOCKS (Xcvr, OTGC, HC, PC) | Xcvr CONTROL, OTGC STATE COMMAND, HC STATE COMMAND, FRAME NUMBER, ETC. |
| DMA CONTROL REGISTER | — | REGISTER FOR SETTING DMA TRANSFER | INSTRUCTION TO START DMA TRANSFER, TOTAL SIZE OF DMA TRANSFER DATA, ETC. |

DATA TRANSMISSION CONTROLLER THAT RESTARTS DATA TRANSMISSION WHEN RECONSTRUCTION IS COMPLETED

Japanese Patent Application No. 2003-142194, filed on May 20, 2003, is hereby incorporated by reference in its entirety.

BACKGROUND OF THE INVENTION

The present invention relates to a data transfer control device, an electronic instrument, and a data transfer control method.

The Universal Serial Bus (USB) 2.0 standard has been developed and has attracted attention as a standard which can implement a data transfer rate of 480 Mbps (HS mode), which is remarkably higher than the data transfer rate in the USB 1.1 standard, while maintaining compatibility with the USB 1.1 standard. Japanese Patent application Laid-open No. 2002-135132 discloses a conventional example of a USB data transfer control device, for example.

The market for the USB 2.0 standard which supports the high speed (HS) mode has grown steadily. The USB On-The-Go (OTG) standard has been developed by the USB Implementers Forum (USB-IF) as a standard which implements a USB simple host. The OTG standard (OTG 1.0) developed as an extension of the USB 2.0 standard has the potential for creating a new added value for the USB interface, and development of applications making use of its characteristics has been anticipated.

A peripheral (peripheral device) which has been connected with a host (personal computer or the like) through the USB can be provided with a host function by utilizing a simple host implemented by the OTG standard or the like. This enables data to be transferred between peripherals by connecting the peripherals through the USB. For example, an image from a digital camera can be printed by directly connecting the digital camera with a printer, or data can be saved by connecting a digital camera or a digital video camera with a storage device.

However, a low performance CPU (processing section in a broad sense) is generally provided in a peripheral provided with the host function by utilizing the OTG simple host or the like. Therefore, if the processing load of the CPU (firmware) included in the peripheral is increased or the processing becomes complicated by the addition of the host function, other processing is hindered or the design period of the instrument is increased.

BRIEF SUMMARY OF THE INVENTION

According to one aspect of the present invention, there is provided a data transfer control device for data transfer through a bus, the data transfer control device comprising:

a buffer controller which allocates a plurality of pipe regions in a packet buffer and controls access to the allocated packet buffer, each of the pipe regions storing data which is transferred between each of the pipe regions and corresponding one of endpoints; and a transfer controller which controls data transfer between the pipe region and a corresponding endpoint, wherein:

the data transfer control device performs pause processing in which data transfer between the pipe region and a corresponding endpoint is paused;

the data transfer control device performs reconstruction processing of the pipe regions after the completion of the pause processing, the reconstruction processing including at least one of delete processing of the allocated pipe region, addition processing of a new pipe region, and size-change processing of the allocated pipe region; and the data transfer control device resumes the paused data transfer after the reconstruction processing of the pipe regions.

According to another aspect of the present invention, there is provided a data transfer control device for data transfer through a bus, the data transfer control device comprising:

a buffer controller which allocates a plurality of pipe regions in a packet buffer and controls access to the allocated packet buffer, each of the pipe regions storing data which is transferred between each of the pipe regions and corresponding one of endpoints; and a transfer controller which controls data transfer between the pipe region and a corresponding endpoint, wherein:

the data transfer control device performs reconstruction processing which includes at least one of delete processing of the allocated pipe region, addition processing of a new pipe region, and size-change processing of the allocated pipe region; and when a first pipe region allocated in the packet buffer corresponding a first endpoint before the reconstruction processing is allocated again after the reconstruction processing, the data transfer control device performs copy processing in which data is read from the first pipe region before the reconstruction processing and the read data is written into the first pipe region after the reconstruction processing.

BRIEF DESCRIPTION OF THE SEVERAL VIEWS OF THE DRAWING

FIGS. 3A and 3B are diagrams for illustrating a pipe region and an endpoint region.

FIGS. 4A and 4B are diagrams for illustrating the reconstruction of a pipe region.

FIGS. 9A to 9C are diagrams for illustrating a region allocation method and a pointer assignment method.

FIG. 19 is a table for illustrating a register section.

DETAILED DESCRIPTION OF THE EMBODIMENT

Embodiments of the present invention will be described below. Note that the embodiments described below do not in any way limit the scope of the invention laid out in the claims herein. In addition, all of the elements of the embodiments described below should not be taken as essential requirements of the present invention.

1. Simple Host 1.1 A-Device and B-Device

The USB On-The-Go (OTG) standard is briefly described below as an example of a standard for implementing a simple host. However, the method of the present invention is not limited to the data transfer control method conforming to the OTG standard.

Figure 1A:
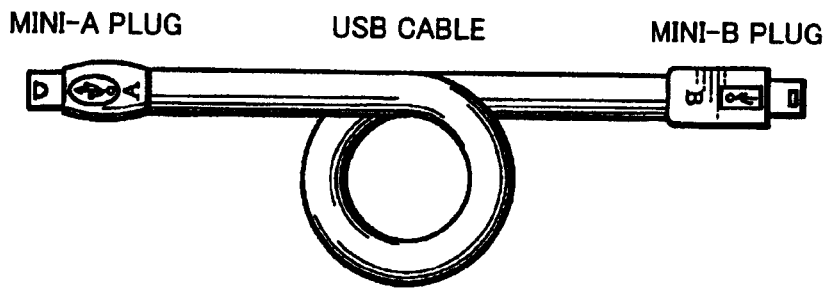
FIGS. 1A, 1B, and 1C are diagrams for illustrating the USB OTG standard.

In the OTG standard, a Mini-A plug and a Mini-B plug as shown in FIG. 1A are defined as the connector standard. A Mini-AB receptacle is also defined as a connector to which both the Mini-A plug and the Mini-B plug (first and second plugs of a cable in a broad sense) can be connected.

Figure 1B:
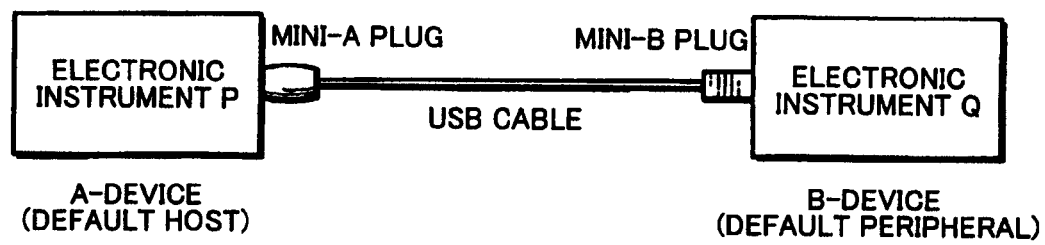
Figure 1C:
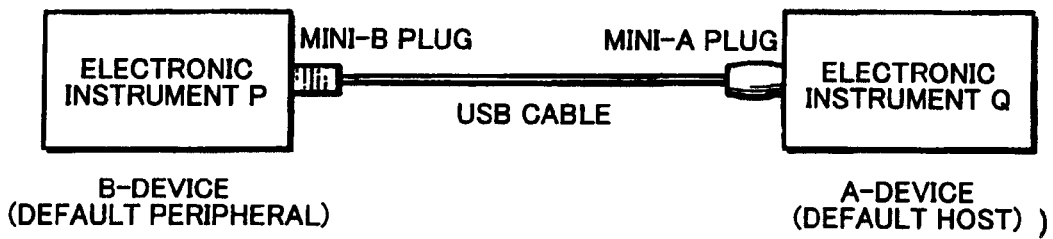

As shown in FIG. 1B, when an electronic instrument P is connected with the Mini-A plug of the USB cable and an electronic instrument Q is connected with the Mini-B plug of the USB cable, the electronic instrument P becomes an A-device and the electronic instrument Q becomes a B-device. When the Mini-B plug and the Mini-A plug are respectively connected to the electronic instruments P and Q as shown in FIG. 1C, the electronic instrument P and the electronic instrument Q respectively become a B-device and an A-device. The electronic instrument determines to which type of plug the electronic instrument is connected by detecting a voltage level of an ID pin by using a built-in pull-up resistor circuit.

In the OTG standard, the A-device (master) provides a power supply (VBUS) (supplier), and the B-device (slave) receives a power supply (receiver). The A-device becomes a host in a default state, and the B-device becomes a peripheral (peripheral device) in a default state.

1.2 Dual-Role Device

A dual-role device capable of having the role of a host (simple host) and the role of a peripheral is defined in the OTG standard.

The dual-role device can become either a host or a peripheral. In the case where a partner connected with the dual-role device is a host or a peripheral in the conventional USB standard, the role of the dual-role device is determined uniquely. In other words, if the connection partner is a host, the dual-role device becomes a peripheral. If the connection partner is a peripheral, the dual-role device becomes a host.

If the connection partner is a dual-role device, the dual-role devices can exchange the role of a host and the role of a peripheral.

The dual-role device has a function of Session Request Protocol (SRP) and a function of Host Negotiation Protocol (HNP). SRP is a protocol for the B-device to request the A-device to supply power to VBUS. HNP is a protocol for exchanging the role of a host and the role of a peripheral.

As described above, when the dual-role devices are connected, the A-device to which the Mini-A plug is connected becomes a default host, and the B-device to which the Mini-B plug is connected becomes a default peripheral. In the OTG standard, the role of a host and the role of a peripheral can be exchanged without plugging and unplugging. HNP is a protocol for implementing the role exchange.

2. OHCI

In the conventional USB standard, a host controller provided in a personal computer which is a host conforms to a standard such as Open Host Controller Interface (OHCI) proposed by Microsoft Corporation or Universal Host Controller Interface (UHCI). An operating system (OS) to be used is limited to the OS produced by Microsoft Corporation or Apple Computer, Inc.

However, in a small portable instrument which is the OTG target application, the architecture of the CPU to be incorporated or the OS to be used is multifarious. Moreover, OHCI and UHCI, which are standardized for a host controller of a personal computer, are developed on the assumption that the entire USB host functions are provided. Therefore, OHCI and UHCI are not optimum for a small portable instrument. In a data transfer control device (host controller) conforming to OHCI, since firmware (host controller driver) which operates on the CPU must create descriptors having a complicated list structure, the processing load of the CPU is increased.

The performance of the CPU embedded in a small portable instrument (digital camera, portable telephone, or the like) is generally lower than the performance of the CPU provided in a personal computer. Therefore, if the portable instrument is allowed to perform the OTG host operation, an excessive load is applied to the CPU embedded in the portable instrument, whereby other processing is hindered or the data transfer performance is decreased.

3. Data Transfer Control Device

Figure 2:
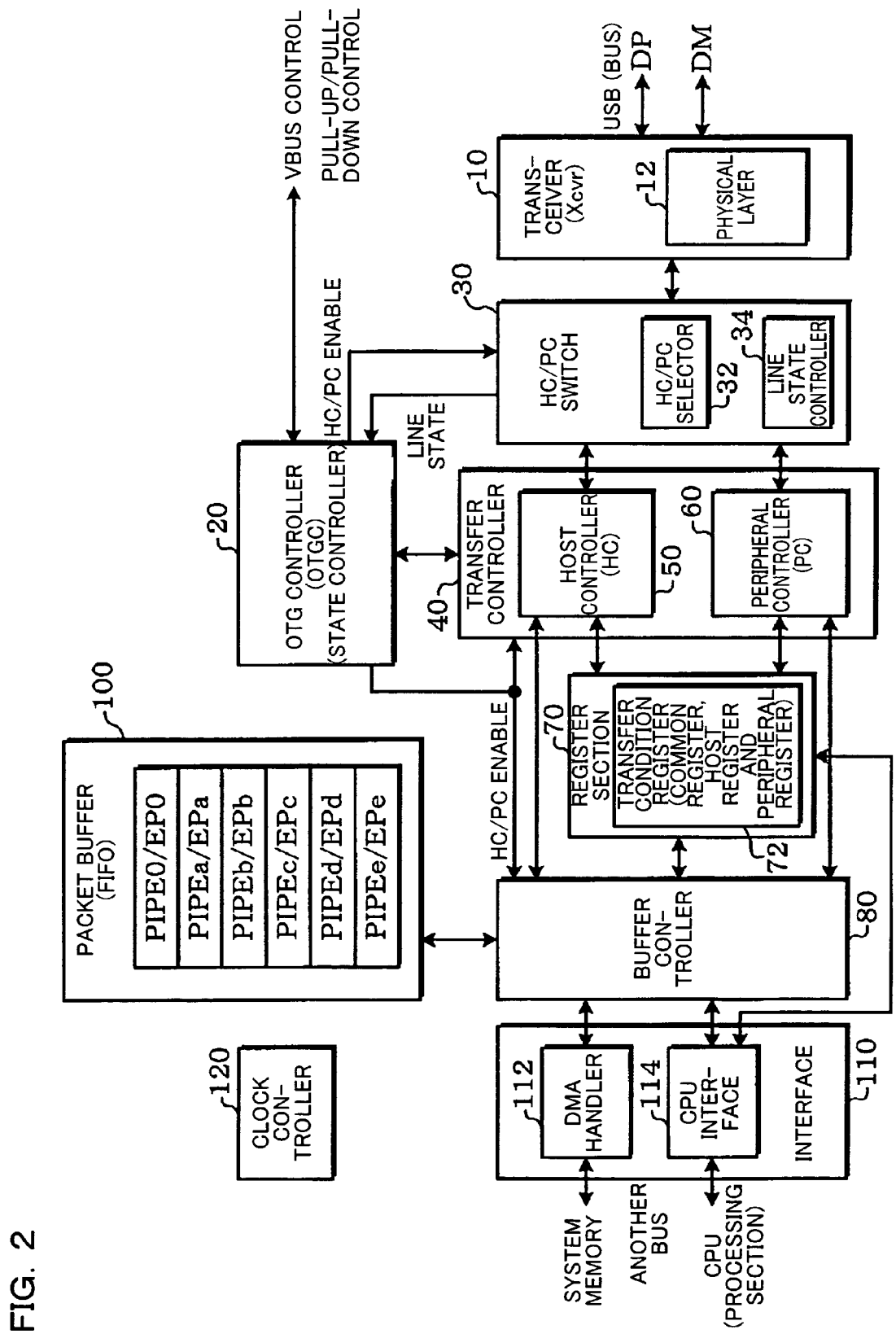
FIG. 2 is a diagram showing the configuration of a data transfer control device according to one embodiment of the present invention.

FIG. 2 shows the configuration of a data transfer control device (or a data transfer control circuit) which can solve the above problems according to one embodiment of the present invention. This data transfer control device may omit part of the functional blocks in FIG. 2. The functional blocks shown in FIG. 2 may be implemented by using only hardware circuits, or by using hardware circuits and firmware (software). Although the description below concerns a data transfer control device conforming to the OTG standard, the present invention can be applied to a data transfer control device conforming to a standard developed from the OTG standard, or to a data transfer control device not conforming to the OTG standard. For example, the present invention can be also applied to a data transfer control device which does not have a dual-role device function but has only a simple host function.

This data transfer control device includes a transceiver 10 (hereafter may be called "Xcvr"). The transceiver 10 is a circuit which transmits and receives data through the USB (bus in a broad sense) by using differential data signals DP and DM, and includes a USB physical layer (PHY) circuit 12. In more detail, the transceiver 10 generates the DP/DM line state (J, K, SE0, or the like), and performs serial/parallel conversion, parallel/serial conversion, bit stuffing, bit unstuffing, NRZI decoding, NRZI encoding, and the like. The transceiver 10 may be provided outside the data transfer control device.

The data transfer control device includes an OTG controller 20 (state controller in a broad sense; hereinafter may be called "OTGC"). The OTG controller 20 performs processing of implementing the SRP function and the HNP function in the OTG standard. Specifically, the OTG controller 20 controls a plurality of states including a state of a host operation which operates in the role of a host, a state of a peripheral operation which operates in the role of a peripheral, and the like.

In more detail, the OTG standard defines state transition of the dual-role device when operating as the A-device and state transition of the dual-role device when operating as the B-device. The OTG controller 20 includes a state machine for implementing the state transition. The OTG controller 20 includes a circuit which detects (monitors) the USB data line state, the VBUS level, and the ID pin state. The state machine included in the OTG controller 20 changes the state (state such as host, peripheral, suspend, or idle) based on the detected information. The state transition may be implemented by using a hardware circuit, or by allowing firmware to set a state command in a register. When the state transition occurs, the OTG controller 20 controls VBUS or controls connection/disconnection of pull-up resistors/pull-down resistors of the data signal lines DP and DM based on the state after transition. The OTG controller 20 controls enabling/disabling of a host controller 50 (hereinafter may be called "HC") and a peripheral controller 60 (hereinafter may be called "PC").

The data transfer control device includes an HC/PC switch circuit 30 (HC/PC common circuit). The HC/PC switch circuit 30 controls connection switching between the transceiver 10 and the host controller 50 or the peripheral controller 60. The HC/PC switch circuit 30 instructs the transceiver 10 to generate the USB data (DP, DM) line state. The connection switching control is implemented by an HC/PC selector 32. The instructions for line state generation are implemented by a line state controller 34.

For example, when the OTG controller 20 asserts an HC enable signal during the host operation, the HC/PC switch circuit 30 (HC/PC selector 32) connects the transceiver 10 with the host controller 50. When the OTG controller 20 asserts a PC enable signal during the peripheral operation, the HC/PC switch circuit 30 connects the transceiver 10 with the peripheral controller 60. This enables the host controller 50 and the peripheral controller 60 to be operated exclusively.

The data transfer control device includes a transfer controller 40. The transfer controller 40 is a circuit which controls data transfer through the USB (bus in a broad sense), and includes the host controller 50 (HC) and the peripheral controller 60 (PC). In the case of implementing only the simple host function, the peripheral controller 60 may not be included in the transfer controller 40.

The host controller 50 is a circuit which controls data transfer in the role of a host during the host operation (when the HC enable signal is asserted). Specifically, the host controller 50 is connected with the transceiver 10 by the HC/PC switch circuit 30 during the host operation. The host controller 50 automatically generates a transaction to an endpoint based on transfer condition information set in a transfer condition register section 72 in a register section 70. The host controller 50 automatically transfers data (packet) (data transfer by a hardware circuit in which the processing section does not take part) between a pipe region (PIPE0 to PIPEe; hereinafter may be called "PIPE") allocated in a packet buffer 100 and an endpoint corresponding to the pipe region.

In more detail, the host controller 50 arbitrates between pipe transfers, and performs time management in a frame, transfer scheduling, resend management, and the like. The host controller 50 manages the transfer condition information (operation information) of pipe transfer through the register section 70. The host controller 50 manages transactions, assembles/disassembles a packet, and issues instructions for generation of a suspend/resume/reset state.

The peripheral controller 60 is a circuit which controls data transfer in the role of a peripheral during the peripheral operation (when the PC enable signal is asserted).

Specifically, the peripheral controller 60 is connected with the transceiver 10 by the HC/PC switch circuit 30 during the peripheral operation. The peripheral controller 60 transfers data between the endpoint region (EP0 to EPe; hereinafter may be called "EP") allocated in the packet buffer 100 and a host based on the transfer condition information set in the transfer condition register section 72 in the register section 70.

In more detail, the peripheral controller 60 manages the transfer condition information (operation information) of endpoint transfer through the register section 70. The peripheral controller 60 manages transactions, assembles/disassembles a packet, and issues instructions for generation of a remote wakeup signal.

The endpoint is a point (portion) on a peripheral (device) to which a unique address can be assigned. Data transfer between a host and a peripheral (device) is performed through the endpoint. A transaction is made up of a token packet, an optional data packet, and an optional handshake packet.

The data transfer control device includes the register section 70. The register section 70 includes various registers for performing data transfer (pipe transfer or endpoint transfer) control, buffer access control, buffer management, interrupt control, block control, or DMA control. The registers may be implemented by a memory such as a RAM, or by D flip-flops or the like. The registers in the register section 70 may not be positioned together, and may be dispersed in each block (HC, PC, OTGC, Xcvr, and the like).

The register section 70 includes the transfer condition register section 72. The transfer condition register section 72 includes registers which store the transfer condition information on data transfer between the pipe region (PIPE0 to PIPEe) allocated in the packet buffer 100 during the host operation and the endpoint. The transfer condition register is provided corresponding to each pipe region in the packet buffer 100.

The endpoint region (EP0 to EPe) is allocated in the packet buffer 100 during the peripheral operation. Data is transferred between the data transfer control device and the host based on the transfer condition information set in the transfer condition register section 72.

The data transfer control device includes a buffer controller 80 (FIFO manager). The buffer controller 80 performs processing of allocating the pipe region or the endpoint region in the packet buffer 100. The buffer controller 80 performs access control and region management of the packet buffer 100. In more detail, the buffer controller 80 controls access from the CPU (access from the processing section), access from the DMA (access from an application layer device), and access from the USB (access from the transfer controller), arbitrates between these accesses, and generates and manages the access address.

The data transfer control device includes the packet buffer 100 (FIFO, packet memory, or data buffer). The packet buffer 100 temporarily stores (buffers) data transferred through the USB (transmission data or reception data). The packet buffer 100 may be formed by a random access memory (RAM), for example. A part or the entirety of the packet buffer 100 may be provided outside the data transfer control device (may be an external memory).

The packet buffer 100 is used as a First-In First-Out (FIFO) for pipe transfer during the host operation. Specifically, the pipe regions PIPE0 to PIPEe (buffer regions in a broad sense) are allocated in the packet buffer 100 corresponding to each endpoint on the USB (bus). Data (transmission data or reception data) transferred between the pipe region and the corresponding endpoint is stored in the pipe regions PIPE0 to PIPEe.

The packet buffer 100 is used as a FIFO for endpoint transfer during the peripheral operation. Specifically, the endpoint regions EP0 to EPe (buffer regions in a broad sense) are allocated in the packet buffer 100 during the peripheral operation. Data transferred to or from a host (transmission data or reception data) is stored in the endpoint regions EP0 to EPe.

The buffer region (region which is assigned to the pipe region during the host operation and assigned to the endpoint region during the peripheral operation) allocated in the packet buffer 100 is assigned to a storage region in which information input first is output first (FIFO region). The pipe region PIPE0 is a pipe region dedicated to the endpoint 0 for control transfer. The pipe regions PIPEa to PIPEe are general-purpose pipe regions which can be assigned to arbitrary endpoints. In the USB standard, the endpoint 0 is assigned to an endpoint dedicated to control transfer. Therefore, confusion by the user can be prevented by assigning the pipe region PIPE0 to the pipe region dedicated to control transfer as in this embodiment. Moreover, the pipe region corresponding to the endpoint can be dynamically changed by assigning the pipe regions PIPEa to PIPEe to the pipe regions which can be assigned to arbitrary endpoints. This increases the degrees of freedom relating to pipe transfer scheduling, whereby efficiency of data transfer can be increased.

In this embodiment, a region size RSize of the buffer region is set by a maximum packet size MaxPktSize (page size in a broad sense) and a number of pages BufferPage (RSize=MaxPktSize×BufferPage). This enables the region size and the number of layers (number of pages) of the buffer region to be arbitrarily set, whereby resources of the packet buffer 100 can be efficiently utilized.

The data transfer control device includes an interface circuit 110. The interface circuit 110 is a circuit for performing data transfer between a direct memory access (DMA) bus or a CPU bus, which is another bus differing from the USB, and the packet buffer 100. The interface circuit 110 includes a DMA handler circuit 112 (first interface circuit in a broad sense) for performing DMA transfer between the packet buffer 100 and an external system memory. The interface circuit 110 also includes a CPU interface circuit 114 (second interface circuit in a broad sense) for performing parallel I/O (PIO) transfer between the packet buffer 100 and the external CPU. The CPU (processing section in a broad sense) may be provided in the data transfer control device.

The data transfer control device includes a clock controller 120. The clock controller 120 generates various clock signals used in the data transfer control device based on a built-in PLL or a clock signal input from the outside.

4. Pipe Region

In this embodiment, the pipe regions PIPE0 to PIPEe are allocated in the packet buffer 100 during the host operation, as shown in FIG. 3A. Data is transferred between each pipe region and each endpoint of a peripheral.

The meaning of the "pipe" of the pipe region in this embodiment differs to some extent from the "pipe" defined in the USB standard (a logical abstraction or a logical path representing the association between an endpoint on a device and software on a host).

As shown in FIG. 3A, the pipe region in this embodiment is allocated in the packet buffer 100 corresponding to each endpoint of a peripheral connected with the USB (bus). In FIG. 3A, the pipe region PIPEa corresponds to an endpoint 1 (bulk IN) of a peripheral 1, and the pipe region PIPEb corresponds to an endpoint 2 (bulk OUT) of the peripheral 1. The pipe region PIPEc corresponds to an endpoint 1 (bulk IN) of a peripheral 2, and the pipe region PIPEd corresponds to an endpoint 2 (bulk OUT) of the peripheral 2. The pipe region PIPEe corresponds to an endpoint 1 (interrupt IN) of a peripheral 3. The pipe region PIPE0 is a pipe region dedicated to an endpoint 0 for control transfer.

In FIG. 3A, USB bulk IN transfer is performed between the pipe region PIPEa and the endpoint 1 of the peripheral 1, and bulk OUT transfer is performed between the pipe region PIPEb and the endpoint 2 of the peripheral 1. Bulk IN transfer is performed between the pipe region PIPEc and the endpoint 1 of the peripheral 2, and bulk OUT transfer is performed between the pipe region PIPEd and the endpoint 2 of the peripheral 2. Interrupt IN transfer is performed between the pipe region PIPEe and the endpoint 1 of the peripheral 3. As described above, arbitrary data transfer (isochronous transfer, bulk transfer, or interrupt transfer) can be performed between the (general-purpose) pipe region and an endpoint corresponding to the pipe region.

In this embodiment, data in a given data unit (data unit specified by the total size) is transferred between the pipe region and the endpoint corresponding to the pipe region. As the data unit, a data unit of which transfer is requested by an I/O request packet (IRP), a data unit obtained by dividing this data unit into an appropriate size, or the like may be used. Data transfer (series of transactions) to the endpoint in this data unit may be called the "pipe" in this embodiment, and a region which stores data (transmission data or reception data) of the "pipe" is the pipe region.

After transfer in a given data unit using the pipe region has finished, the pipe region may be released. The released pipe region may be assigned to an arbitrary endpoint. The correspondence between the pipe region and the endpoint can be dynamically changed in this manner.

The endpoint regions EP0 to EPe are allocated in the packet buffer 100 during the peripheral operation, as shown in FIG. 3B. Data is transferred between each endpoint region and the host.

As described above, in this embodiment, the buffer region of the packet buffer 100 is assigned to the pipe region during the host operation and is assigned to the endpoint region during the peripheral operation. This enables resources of the packet buffer 100 to be used in common during the host operation and the peripheral operation, whereby the use storage capacity of the packet buffer 100 can be saved. The number of pipe regions and endpoint regions is not limited to six. The number of pipe regions and endpoint regions may be arbitrary.

5. Reconstruction of Pipe Region

5.1 Reconstruction Processing

In the method of transferring data by allocating the pipe region in the packet buffer 100 as shown in FIGS. 3A and 3B, reconstruction processing of the pipe region must be performed when a new endpoint is added on the USB or the existing endpoint is deleted. The reconstruction processing includes at least one of processing of deleting the allocated pipe region (existing pipe region), processing of adding a new pipe region (pipe region which does not exist), and processing of changing the size of the allocated pipe region.

In FIG. 4A, only a peripheral 1 is connected with a USB hub. Since the peripheral 1 (electronic instrument) has endpoints a, b, and e, pipe regions PIPEa, PIPEb, and PIPEe corresponding to the endpoints a, b, and e are allocated in the packet buffer 100.

In FIG. 4B, a peripheral 2 is additionally connected with the USB hub, and an endpoint c of the peripheral 2 is added. In this case, it is necessary to reconstruct the pipe region by adding a pipe region PIPEc corresponding to the endpoint c to the packet buffer 100. When the peripheral 2 is disconnected in a state in which the peripheral 2 is connected with the USB hub as shown in FIG. 4B, it is necessary to reconstruct the pipe region by deleting the pipe region PIPEc corresponding to the endpoint c.

In this case, as a reconstruction method for the pipe region, reallocation processing of the pipe regions PIPEa to PIPEe may be performed after completion of data transfers for all the pipe regions so that the pipe configuration as shown in FIG. 4B is implemented.

However, this method makes it necessary to perform the reallocation processing of the pipe regions after waiting for the pipe region to become empty of effective data or removing data remaining in the pipe region after terminating data transfer for the pipe region. However, the transfer cycle for interrupt transfer is as long as 1 to 255 msec, and the size of IRP data transferred by using the pipe region may be very large. In this case, reconstruction of the pipe region takes a long time by waiting for the pipe region to become empty, whereby convenience to the user is impaired. Moreover, the processing of the CPU (processing section) becomes complicated due to the processing of waiting for the pipe region to become empty or the processing of removing data from the pipe region, whereby the processing load is increased. Furthermore, since the transfer rate at which the partner device transmits data is unknown, it is impossible to estimate the necessary wait time.

Therefore, this embodiment of the present invention employs the following method. Specifically, when reconstructing the pipe region (when instructions for reconstruction are issued by the processing section), the transfer controller 40 (host controller 50) shown in FIG. 2 pauses data transfer currently performed between the pipe region (preferably all the pipe regions) and the endpoint. In more detail, when reconstructing the pipe regions in the middle of a transaction, the transfer controller 40 pauses data transfer when the transaction is completed. The transfer controller 40 may pause data transfer after completion of a given number of transactions.

The buffer controller 80 performs the reconstruction processing of the pipe region after the pause processing of data transfers for all the pipe regions (there may be some exceptions) has been completed, for example. In more detail, the buffer controller 80 performs processing of deleting the pipe region, processing of adding the pipe region, or processing of changing the size of the pipe region. The buffer controller 80 performs processing of preventing data stored in the pipe region which exists before and after reconstruction from being destroyed (erased). Specifically, the buffer controller 80 performs copy (moving) processing of the data stored in the pipe region. The buffer controller 80 may perform processing of changing only the logical address of the pipe region without changing the physical address of the pipe region. The buffer controller 80 then performs reallocation (ReAllocation, SetBuffer) processing of the pipe regions. After the reallocation processing of all the pipe regions has been completed, the transfer controller 40 resumes the data transfer which has been paused. For example, the transfer controller 40 resumes the data transfer from the transaction subsequent to the transaction which has been completed.

This makes it unnecessary to perform the processing while distinguishing whether the pipe region is used for reception or transmission. Moreover, it is unnecessary to wait for the pipe region to become empty, and the time required for reconstruction of the pipe region can be easily known. Therefore, the reconstruction processing can be completed in a short time, whereby the processing of the firmware can be simplified and the processing load can be reduced.

5.2 Reconstruction by Copy Processing

Figure 5A:
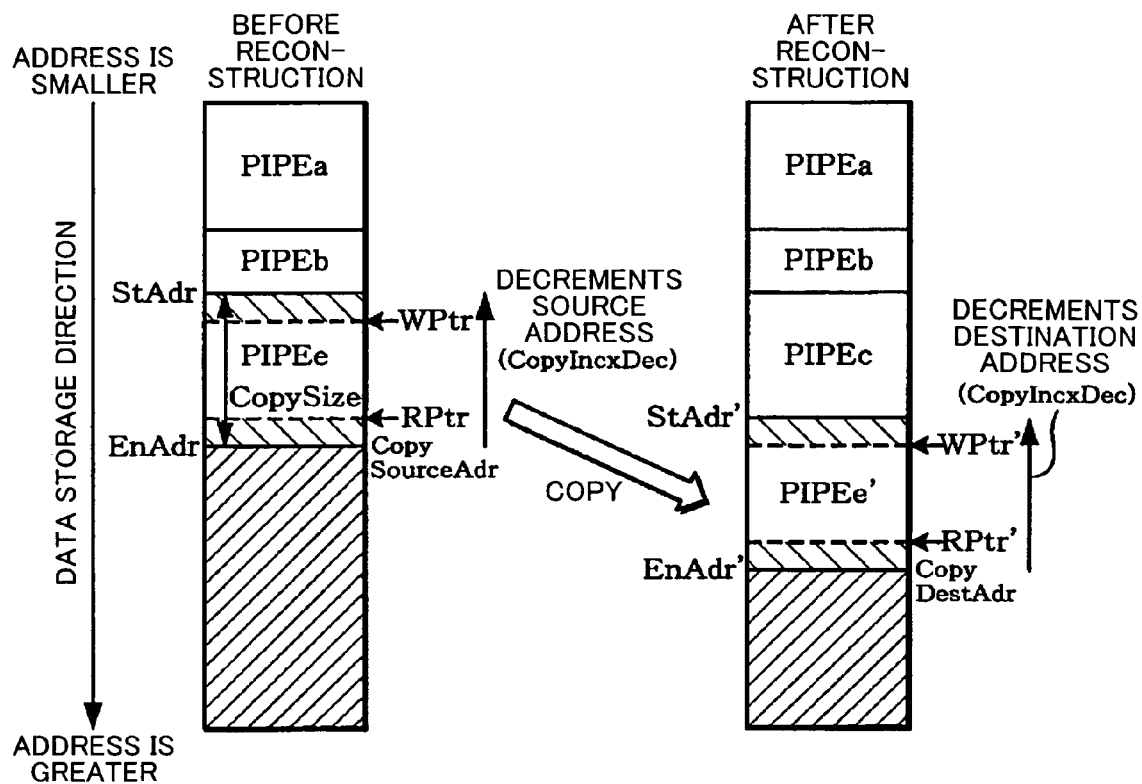
FIGS. 5A and 5B are diagrams for illustrating the reconstruction by copy processing.
Figure 5B:
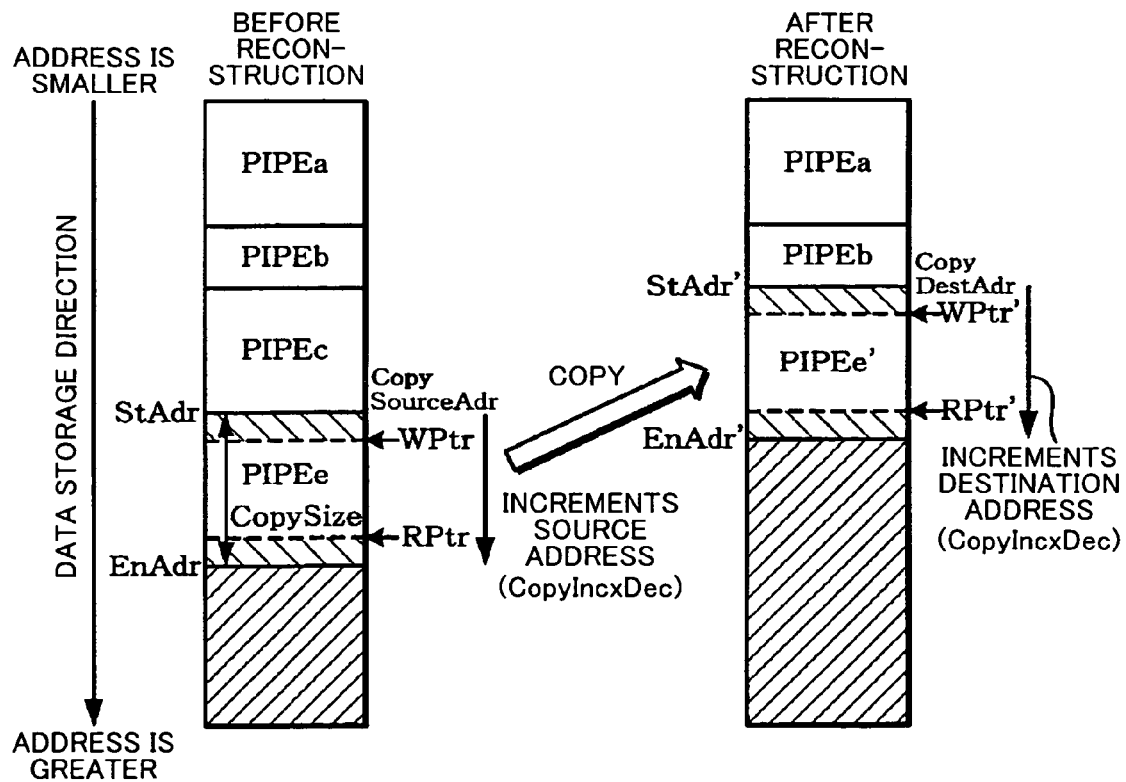

In this embodiment, data stored in the pipe region which exists before and after reconstruction is copied (moved) so that the data is not destroyed (erased or overwritten). In more detail, the pipe region PIPEe (first pipe region) which has been allocated in the packet buffer 100 corresponding to the endpoint e (first endpoint) before reconstruction is also allocated in the packet buffer 100 after reconstruction, as shown in FIGS. 5A and 5B. In this case, copy processing of reading data from the pipe region PIPEe before reconstruction and writing the read data into the pipe region PIPEe' after reconstruction is performed.

In FIG. 5A, a start address StAdr' (or end address EnAdr') of the pipe region PIPEe' after reconstruction is greater than a start address StAdr (or end address EnAdr) of the pipe region PIPEe before reconstruction. In this case, data is read from the pipe region PIPEe while decrementing a source address which is a read address of the pipe region PIPEe before reconstruction. In more detail, data is sequentially read in units of bytes while sequentially decrementing the source address from its initial value (CopySourceAdr, EnAdr). The read data is then written into the pipe region PIPEe' after reconstruction while decrementing a destination address which is a write address of the pipe region PIPEe' after reconstruction. In more detail, data is sequentially read in units of bytes while sequentially decrementing the destination address from its initial value (CopyDestAdr, EnAdr').

In FIG. 5B, the start address StAdr' (or end address EnAdr') of the pipe region PIPEe' after reconstruction is smaller than the start address StAdr (or end address EnAdr) of the pipe region PIPEe before reconstruction. In this case, data is read from the pipe region PIPEe before reconstruction while incrementing the source address from its initial value (CopySourceAdr, StAdr). The read data is then written into the pipe region PIPEe after reconstruction while decrementing the destination address from its initial value (CopyDestAdr, StAdr').

This enables the data stored in the pipe region PIPEe before reconstruction to be copied to the pipe region PIPEe' after reconstruction without destroying the data. Therefore, an appropriate reconstruction processing of the pipe region can be implemented with a reduced processing load.

The initial values of the source address and the destination address of the copy processing are set by CopySourceAdr and CopyDestAdr, respectively. Whether to decrement or increment the source address and the destination address is set by CopyIncxDec. The size of data to be copied is set by CopySize. These settings may be implemented by allowing the firmware (CPU or processing section) to set desired values in CopySourceAdr, CopyDestAdr, CopyIncxDec, and CopySize registers.

The pipe region which becomes the target of the copy processing may be only the pipe region of which the start address StAdr and the end address EnAdr change before and after the reconstruction processing, such as the pipe region PIPEe. The pipe region of which the start address StAdr and the end address EnAdr do not change, such as the pipe regions PIPEa and PIPEb, may be the target of the copy processing.

In this embodiment, moving (copy or conversion) processing of a write pointer WPtr and a read pointer RPtr is performed during the reconstruction processing, as shown in FIGS. 5A and 5B. The write pointer WPtr is a pointer which points to the data write address (write location) in the pipe region, and the read pointer RPtr is a pointer which points to the data read address (read location) in the pipe region. The pointer moving processing is performed so that the write pointer WPtr' and the read pointer RPtr' after reconstruction point to the locations corresponding to the data write address and the data read address indicated by the write pointer WPtr and the read pointer RPtr in the pipe region PIPEe before reconstruction in the pipe region PIPEe' after reconstruction. Therefore, data write processing and data read processing can be appropriately resumed after reconstruction at the locations of the write address and the read address at which the data transfer has paused.

5.3 Operation

A specific operation during the reconstruction processing is described below by using a flowchart shown in FIG. 6 and a timing waveform chart shown in FIG. 7. As indicated by F1 in FIG. 7, the firmware (F/W) sets a signal TranPause which directs data transfer (USB transfer and DMA transfer) to pause at "1" (assert) (step S51). This is implemented by allowing the firmware (processing section which controls the data transfer control device in a broad sense; hereinafter the same) to write "TranPause=1" in a TranPause register which is a register for directing the pause processing of data transfer to be performed. This register is provided in the register section 70 shown in FIG. 2, for example.

Figure 7:
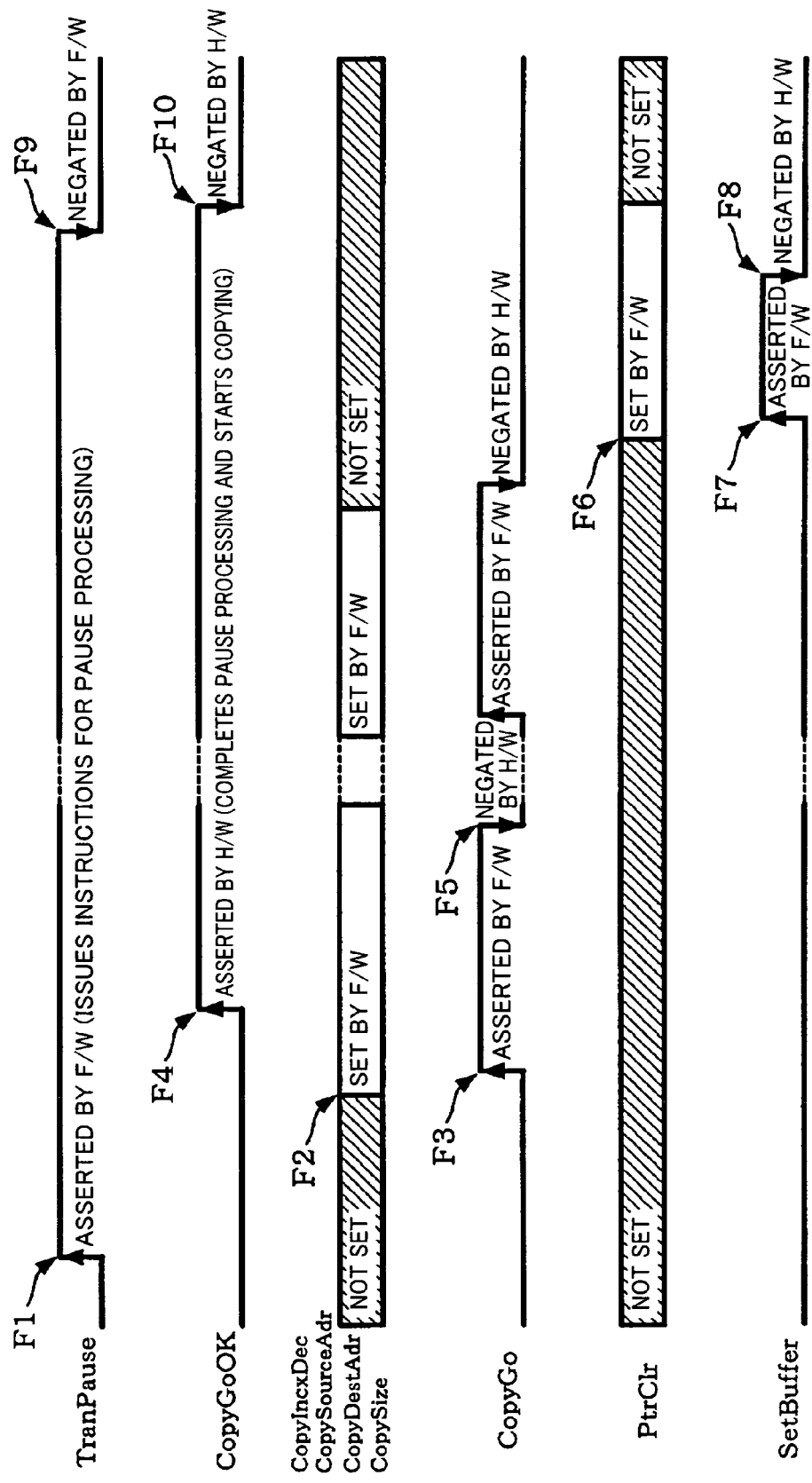
FIG. 7 is a timing waveform chart for illustrating the operation during reconstruction processing.

As indicated by F2 in FIG. 7, the firmware sets reconstruction conditions (CopyIncxDec, CopySourceAdr, CopyDestAdr, CopySize, MaxPktSize, and BufferPage) (step S52). This is implemented by allowing the firmware to write register values in CopyIncxDec, CopySourceAdr, CopyDestAdr, CopySize, MaxPktSize, and BufferPage registers. These registers are provided in the register section 70, for example.

The CopyIncxDec register (signal) is a register (signal) for the firmware to issue instructions to increment or decrement the source address which is the read address of the copy processing and the destination address which is the write address of the copy processing. For example, CopyIncxDec is set at "0" in FIG. 5A, whereby the source address and the destination address are directed to be decremented. CopyIncxDec is set at "1" in FIG. 5B, whereby the source address and the destination address are directed to be incremented.

The CopySourceAdr and CopyDestAdr registers (signals) are registers (signals) for the firmware to issue instructions for the initial values of the source address and the destination address. In FIG. 5A, CopySourceAdr is set at the end address EnAdr of the pipe region PIPEe before reconstruction, and CopyDestAdr is set at the end address EnAdr' of the pipe region PIPEe' after reconstruction. In FIG. 5B, CopySourceAdr is set at the start address StAdr of the pipe region PIPEe, and CopyDestAdr is set at the start address StAdr' of the pipe region PIPEe'.

The CopySize register is a register for setting the size of data to be copied. The MaxPktSize and BufferPage registers are registers for setting the maximum packet size and the number of pages of the pipe region.

After setting the reconstruction conditions, the firmware sets CopyGo at "1" as indicated by F3 in FIG. 7 (step S53). This is implemented by allowing the firmware to write "CopyGo =1" in a CopyGo register which is a register for directing the copy processing of the pipe region to be started.

The firmware waits for data transfer (USB transfer or DMA transfer) to pause (step S54). In more detail, the firmware waits for the hardware circuit (H/W) to write "1" in a CopyGoOK register which is a register for notifying the firmware that the pause processing has been completed for all the pipe regions. When CopyGoOK is set at "1" as indicated by F4 in FIG. 7, the firmware waits for completion of copying of data in one pipe region (step S55). In more detail, the firmware waits for the hardware circuit to set CopyGo at "0".

When CopyGo is set at "0" as indicated by F5 in FIG. 7, it is determined whether or not copying of data in all the pipe regions has been completed (step S56). When copying of data in all the pipe regions has not been completed, the processing returns to the step S52. When copying of data in all the pipe regions has been completed, the firmware sets data in a PtlClr register as indicated by F5 in FIG. 7 (step S57).

The PtlClr register is a register for the firmware to set switching between a mode in which the moving (copy) processing of the write pointer WPtr and the read pointer RPtr is performed and a mode in which the write pointer WPtr and the read pointer RPtr are cleared. In more detail, the PtlClr register is a register for the firmware to set switching between a mode in which the write pointer WPtr and the read pointer RPtr are moved so that the write pointer and the read pointer point to the locations corresponding to the write address and the read address in the pipe region PIPEe before reconstruction in the pipe region PIPEe' after reconstruction, as shown in FIGS. 5A and 5B, and a mode in which the write pointer WPtr and the read pointer RPtr are cleared so that the write pointer and the read pointer point to the start address StAdr' and the end address EnAdr' of the pipe region PIPEe'. This register is provided for each pipe region.

As indicated by F7 in FIG. 7, the firmware sets "1" in a SetBuffer register which is a register for issuing instructions to the hardware circuit to perform the reallocation processing of the pipe regions (step S58). This allows reset processing of the start address and the end address of each pipe region and the pointer moving processing to be performed. The firmware waits for completion of the SetBuffer (region reallocation) processing (step S59). When SetBuffer is set at "0" (negated) by the hardware circuit as indicated by F8, the firmware sets TranPause at "0" as indicated by F9 (step S60). This causes CopyGoOK to be set at "0" by the hardware circuit as indicated by F10, whereby the data transfer which has been paused is resumed (step S61).

Figure 6:
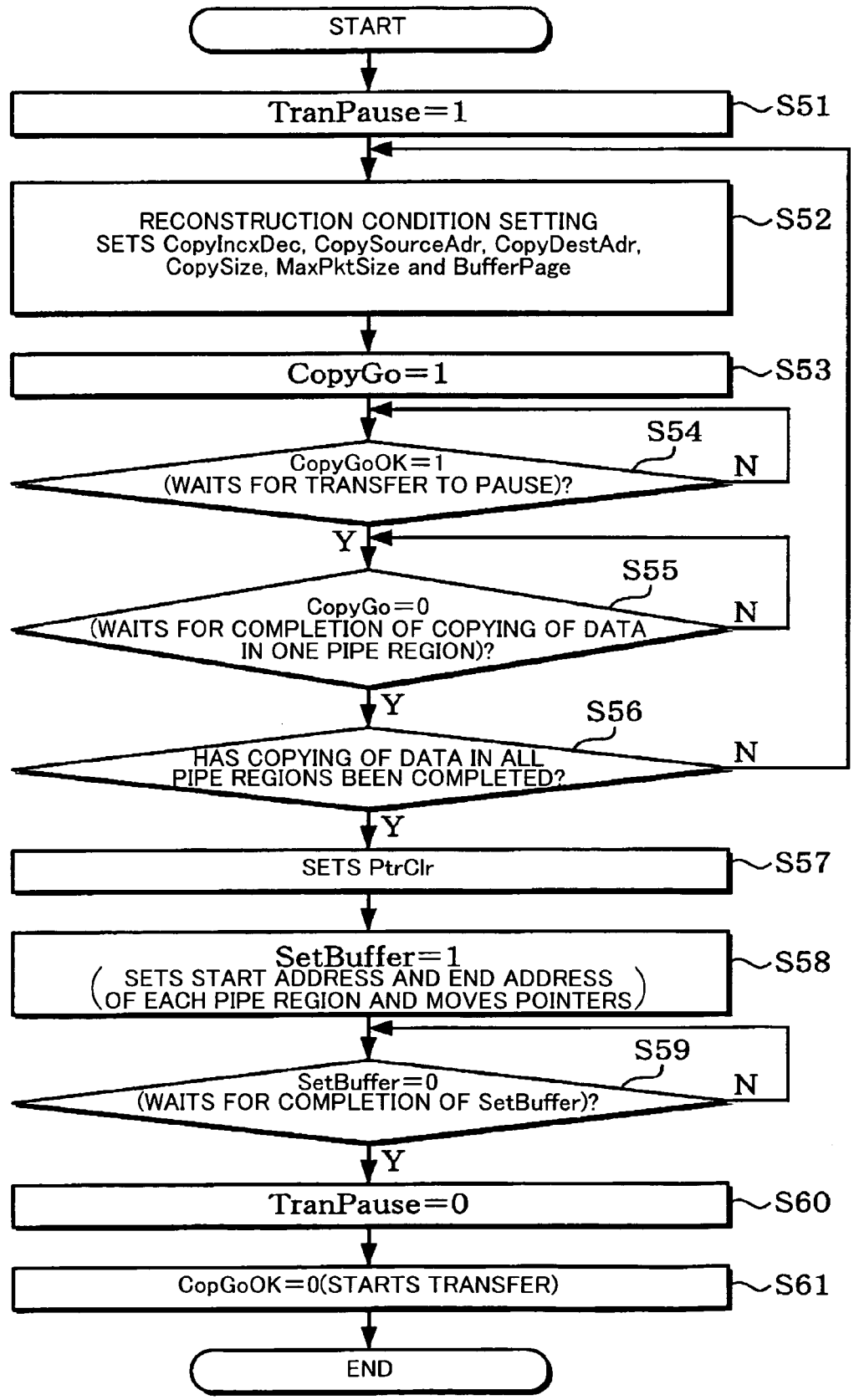
FIG. 6 is a flowchart for illustrating the operation during reconstruction processing.

A highly efficient and reliable reconstruction processing can be implemented by assigning different roles to the firmware (software) and the hardware circuit (buffer controller and transfer controller) as shown in FIGS. 6 and 7. Specifically, the configuration of the hardware circuit can be simplified and the scale of the hardware circuit can be reduced by allowing the firmware to set the reconstruction conditions as indicated by F2 in FIG. 7. Moreover, the copy processing of the pipe regions can be efficiently performed using a small number of registers by allowing the hardware circuit to negate CopyGo each time the copy processing of one pipe region is completed to notify the firmware of completion of the copy processing as indicated by F5 in FIG. 7. Furthermore, a highly reliable pause processing and resume processing can be implemented by allowing the firmware to instruct the hardware circuit to start or finish the pause processing of data transfer as indicated by F1 and F9 in FIG. 7.

The copy processing for a plurality of pipe regions may be performed in parallel. The reconstruction conditions (CopyIncxDec, CopySourceAdr, CopyDestAdr, and the like) may be automatically set by the hardware circuit. This complicates the configuration of the hardware circuit. However, since it suffices that the firmware merely issue instructions for start of reconstruction, the processing load of the firmware can be reduced.

5.4 Configuration

Figure 8:
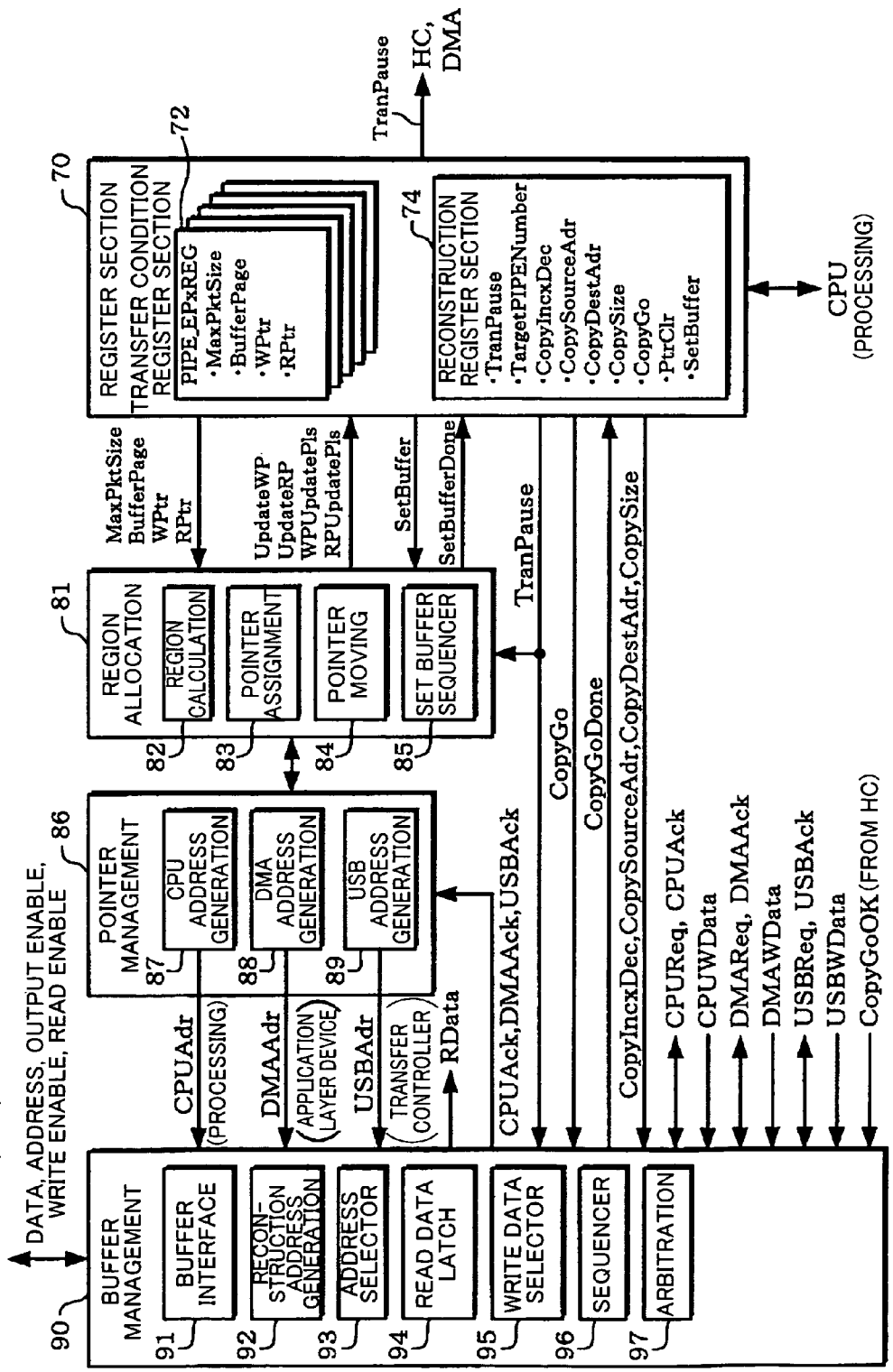
FIG. 8 is a diagram showing detailed configuration of a buffer controller.

Circuits for implementing the reconstruction processing will be described below. FIG. 8 shows the configuration of the buffer controller 80. The buffer controller 80 may have configuration in which part of the functional blocks shown in FIG. 8 is omitted. Part of the functional blocks may be implemented by software.

The buffer controller 80 includes a region allocation circuit 81. The region allocation circuit 81 is a circuit which allocates a buffer region in the packet buffer 100. The buffer region is a region which is assigned to the pipe region during the host operation and assigned to the endpoint region during the peripheral operation.

The region allocation circuit 81 includes a region calculation circuit 82, a pointer assignment circuit 83, a pointer moving circuit 84, and a set buffer sequencer 85. The region allocation circuit 81 may have a configuration in which some of these circuits are omitted.

The region calculation circuit 82 is a circuit which calculates the region size, start address, and end address of the buffer region (pipe region or endpoint region) based on the maximum packet size (page size) and the number of pages.

Figure 9A:
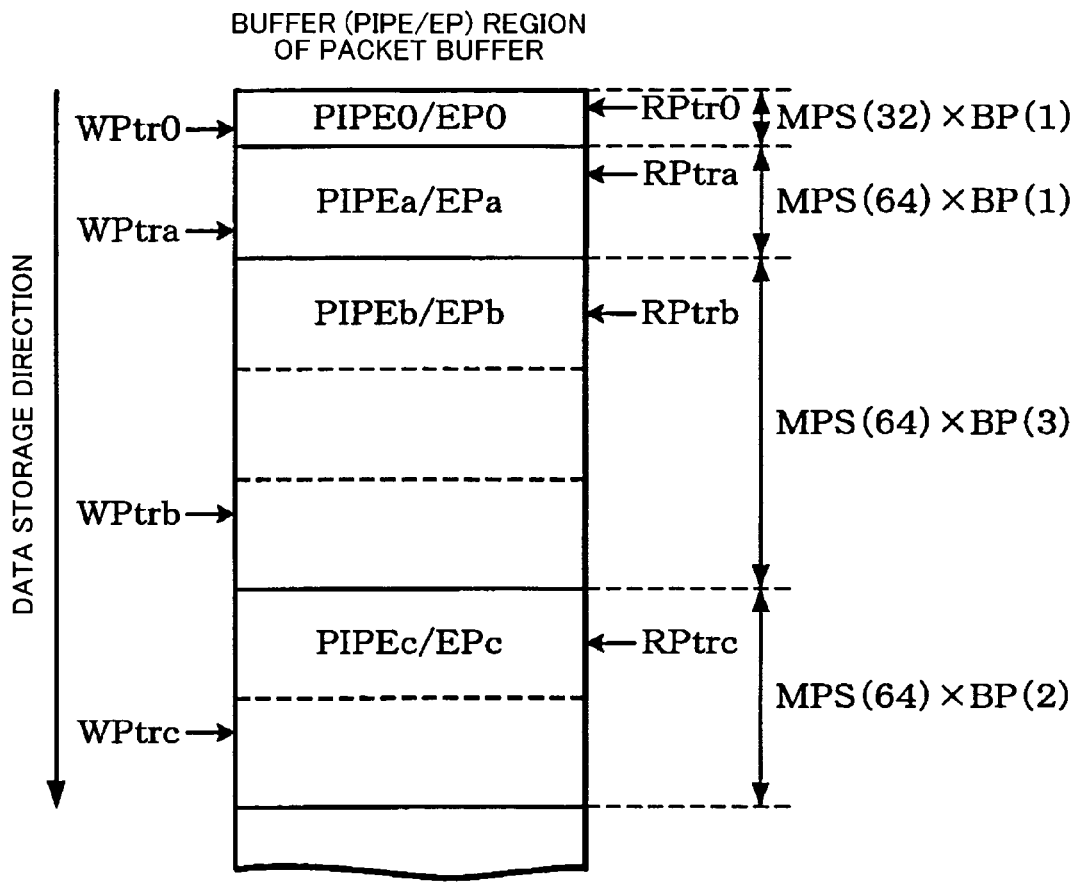

In the buffer regions PIPE0/EP0, PIPEa/EPa, PIPEb/EPb, and PIPEc/EPc shown in FIG. 9A, the maximum packet size (MaxPktSize) is respectively set at 32, 64, 64, and 64 bytes, and the number of pages (BufferPage) is respectively set at 1, 1, 3, and 2 pages. The region calculation circuit 82 calculates the region sizes, start addresses, and end addresses of the buffer regions PIPE0/EP0 to PIPEc/EPc based on the maximum packet size, the number of pages, and the like. In FIG. 9A, the region sizes of the buffer regions PIPE0/EP0, PIPEa/EPa, PIPEb/EPb, and PIPEc/EPc are respectively calculated to be 32 (=32×1), 64 (=64×1), 192 (=64×3), and 128 (=64×2) bytes.

The pointer assignment circuit 83 is a circuit which assigns the write pointer WPtr (WPtr0, WPtra, WPtrb, and WPtrc) and the read pointer RPtr (RPtr0, RPtra, RPtrb, and RPtrc) of each buffer region to a DMA pointer, a CPU pointer, and a USB pointer.

As shown in FIG. 9B, when data is transmitted (when data is transferred from DMA or CPU to USB through the packet buffer 100) using DMA transfer, the write pointer WPtr of the buffer region is assigned to the DMA (DMA access) pointer, and the read pointer RPtr is assigned to the USB (USB access) pointer. When data is transmitted using CPU (PIO) transfer, the write pointer WPtr of the buffer region is assigned to the CPU (CPU access) pointer, and the read pointer RPtr is assigned to the USB pointer.

As shown in FIG. 9C, when data is received (when data is transferred from USB to DMA or CPU through the packet buffer 100) using DMA transfer, the write pointer WPtr of the buffer region is assigned to the USB pointer, and the read pointer RPtr is assigned to the DMA pointer. When data is received using CPU transfer, the write pointer WPtr of the buffer region is assigned to the USB pointer, and the read pointer RPtr is assigned to the CPU pointer.

The information (address information) on the write pointer WPtr and the read pointer RPtr of each buffer region is retained in each transfer condition register (PIPE/EP register) in the register section 70.

The pointer moving circuit 84 is a circuit which performs processing of moving the write pointer and the read pointer during reconstruction. Specifically, the pointer moving circuit 84 performs the moving processing of the write pointer and the read pointer so that the write pointer and the read pointer point to the locations corresponding to the write address and the read address of data in the pipe region before reconstruction in the pipe region after reconstruction. In other words, the pointer moving circuit 84 performs the moving processing of the write pointer and the read pointer so that the address values relative to the start address and the end address of the pipe region do not change before and after reconstruction. When PtlClr is set at "1" at F6 in FIG. 7, the pointer moving circuit 84 performs processing of clearing the write pointer WPtr and the read pointer RPtr (processing of moving the write pointer WPtr and the read pointer RPtr to the start address and the end address, respectively).

When SetBuffer is set at "1" by the firmware as indicated by F7 in FIG. 7, the set buffer sequencer 85 controls the sequence of the reallocation processing of the buffer regions.

The buffer controller 80 includes a pointer management circuit 86. The pointer management circuit 86 is a circuit which generates an actual address for accessing the packet buffer 100 while updating the pointers. The pointer management circuit 86 includes a CPU address generation circuit 87, a DMA address generation circuit 88, and a USB address generation circuit 89. The generation circuits 87, 88, and 89 respectively generate a CPU address CPUAdr, a DMA address DMAAdr, and a USB address USBAdr based on the CPU pointer, the DMA pointer, and the USB pointer assigned by the pointer assignment circuit 83. The pointer management circuit 86 updates the pointers each time access from the CPU (processing section) or DMA (application layer device) occurs or each time a transaction of the USB (transfer controller) is completed (transmission or reception of a handshake such as ACK or NAK). The updated pointer information (UpdateWP and UpdateRP) is rewritten into each transfer condition register in the register section 70 through the region allocation circuit 81.

The buffer controller 80 includes a buffer management circuit 90. The buffer management circuit 90 is a circuit which manages and controls access (write access or read access) to the packet buffer 100. The buffer management circuit 90 includes a buffer interface circuit 91, a reconstruction address generation circuit 92, an address selector 93, a read data latch circuit 94, a write data selector 95, a sequencer 96, and an arbitration circuit 97. The buffer management circuit 90 may have a configuration in which some of these circuits are omitted.

The buffer interface circuit 91 inputs or outputs data to or from the packet buffer 100, and outputs the address, output enable, write enable, read enable, and the like upon receiving the CPU address, DMA address, and USB address from the pointer management circuit 86 and the like.

The reconstruction address generation circuit 92 generates the source address and the destination address of the copy processing as described with reference to FIGS. 5A and 5B, selects one of the generated source address and the generated destination address, and outputs the selected address as a reconstruction address.

The address selector 93 selects one of the reconstruction address from the reconstruction address generation circuit 92, the CPU address CPUAdr (access address from the processing section), the DMA address DMAAdr (access address from the application layer device), and the USB address USBAdr (access address from the transfer controller), and outputs the selected address to the packet buffer 100.

The read data latch circuit 94 latches the data read from the packet buffer 100. The write data selector 95 selects one of the data latched by the read data latch circuit 94, write data CPUWdata from the CPU (processing section), write data DMAWdata from the DMA (application layer device), and write data USBW data from the USB (transfer controller), and outputs the selected data to the packet buffer 100. The sequencer 96 controls the sequence of each circuit in the buffer management circuit 90.

The arbitration circuit 97 is a circuit which arbitrates between accesses (CPUReq, DMAReq, and USBReq) from the CPU (CPU interface circuit), DMA (DMA handler circuit), and USB (HC or PC). One of the CPU address, DMA address, and USB address is output as the access address of the packet buffer 100 based on the arbitration result, whereby a data transfer path between the CPU, DMA, or USB and the packet buffer 100 is established.

As shown in FIG. 8, the register section 70 includes the transfer condition register section 72 in which the transfer conditions for each buffer region are set, and a reconstruction register section 74. The reconstruction register section 74 includes registers for setting TranPause, TargetPIPENumber, CopyIncxDec, CopySourceAdr, CopyDestAdr, CopySize, CopyGo, PtrClr, and SetBuffer described with reference to FIGS. 6 and 7 and the like. These registers can be accessed from the CPU (processing section) so that the CPU writes or reads the register values.

Figure 10:
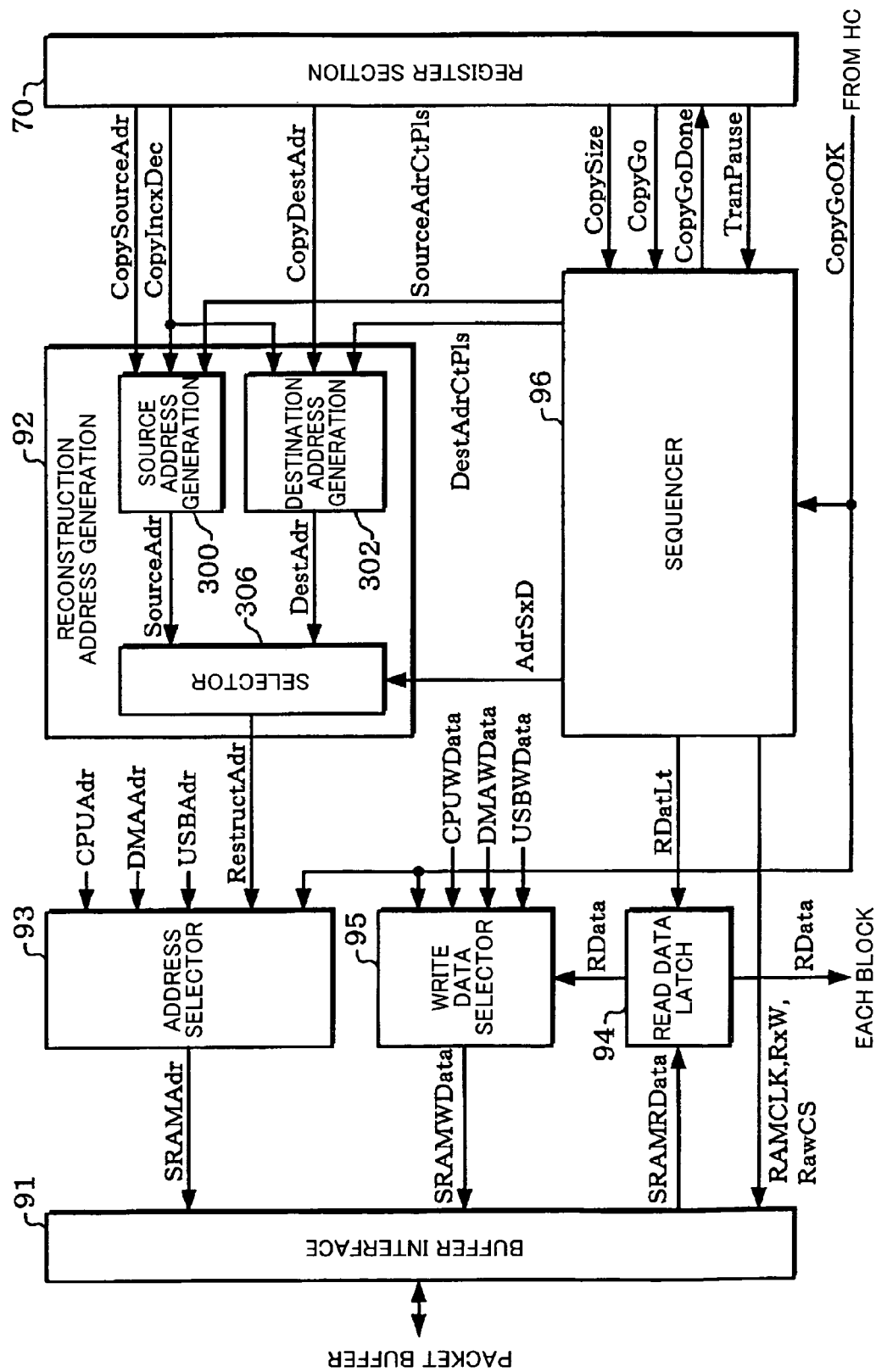
FIG. 10 is a diagram showing detailed configuration of a buffer management circuit.
Figure 11:
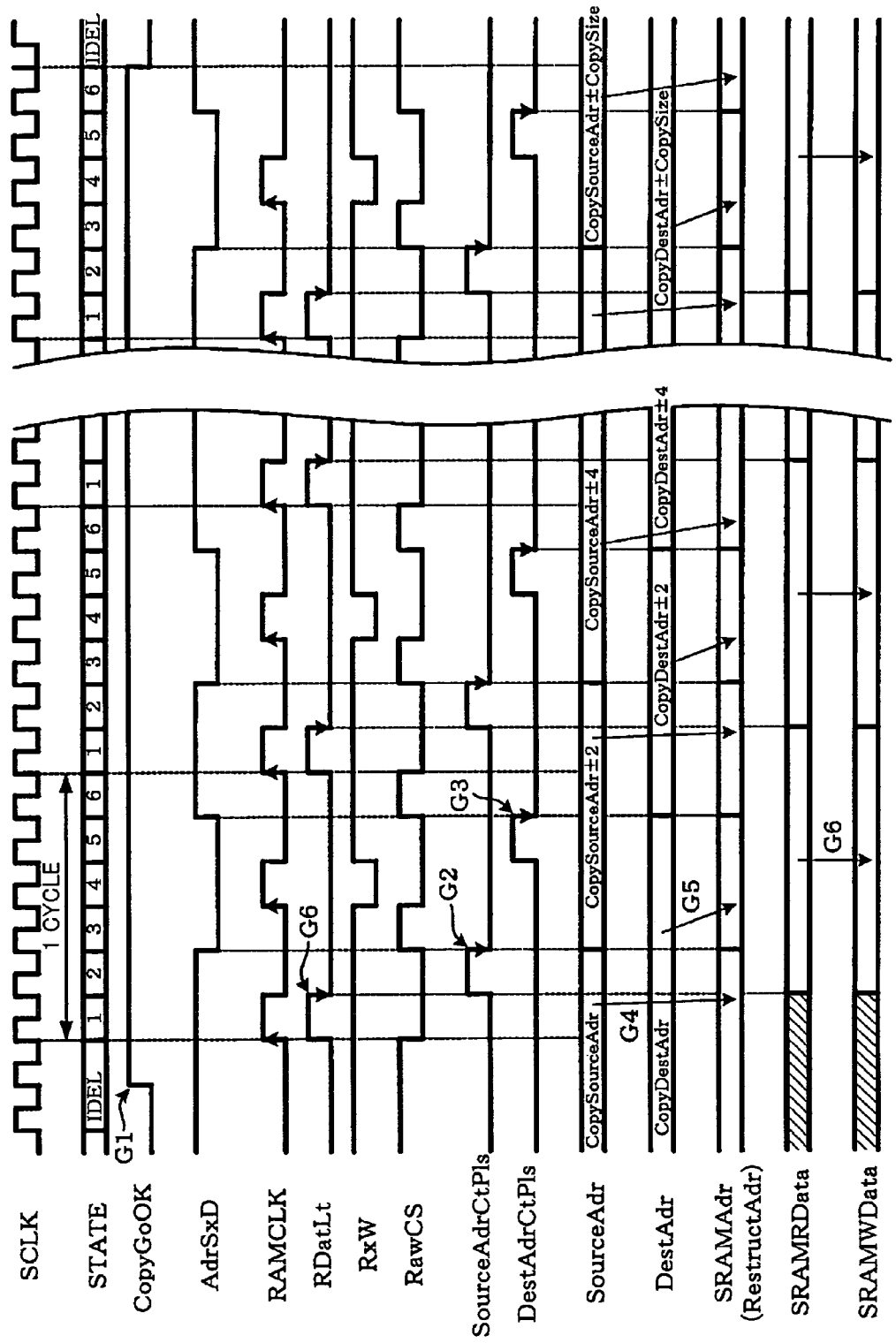
FIG. 11 is a timing waveform chart for illustrating the operation of a buffer management circuit.

FIG. 10 shows the configuration of the buffer management circuit 90 of FIG. 8, and FIG. 11 is a timing waveform chart for illustrating the operation of the buffer management circuit 90.

When CopyGo is asserted as indicated by G1 in FIG. 11, the sequencer 96 shown in FIG. 10 starts the sequence of the copy processing. A source address generation circuit 300 performs processing of incrementing or decrementing the source address SourceAdr from the initial value CopySourceAdr. A destination address generation circuit 302 performs processing of incrementing or decrementing the destination address DestAdr from the initial value CopyDestAdr. Specifically, increment (count up) processing is performed when CopyIncxDec is set at an H level, and decrement (count down) processing is performed when CopyIncxDec is set at an L level. The source address generation circuit 300 and the destination address generation circuit 302 performs the increment or decrement processing in synchronization with falling edges of count pulse signals SourceAdrCtPls and DestAdrCtPls, respectively, as indicated by G2 and G3 in FIG. 11. SCLK is a clock signal, and STATE is a state signal.

A selector 306 selects one of SourceAdr and DestAdr based on an address select signal AdrSxD from the sequencer 96, and outputs the selected address as a reconstruction address RestructAdr as indicated by G4 and G5 in FIG. 11. The selector 306 selects SourceAdr when AdrSxD is set at an H level, and selects DestAdr when AdrSxD is set at an L level.

The address selector 93 selects one of the CPU address CPUAdr, the DMA address DMAAdr, the USB address USBAdr, and the reconstruction address RestructAdr, and outputs the access address SRAMAdr to the packet buffer 100. In more detail, the address selector 93 selects and outputs RestructAdr when CopyGoOK is set at an H level.

The read data latch circuit 94 latches data read from the packet buffer 100 through the buffer interface circuit 91 at a falling edge of a latch signal RDatLt from the sequencer 96. The read data latch circuit 94 outputs the latched data to each block and the write data selector 95.

RAMCLK shown in FIG. 11 is an access clock signal to the packet buffer 100 (RAM). Data is written into or read from the packet buffer 100 at a rising edge of RAMCLK. In more detail, data is read when RxW is set at an H level, and data is written when RxW is set at an L level. RawCS is a chip select signal.

The write data selector 95 selects one of the write data CPUWData, DMAWData, and USBWData from the CPU, DMA, and USB and the read data RData from the read data latch circuit 94, and outputs the selected data to the packet buffer 100 as write data SRAMWData. In more detail, the write data selector 95 selects RData when CopyGoOK is set at an H level as indicated by G6 in FIG. 11, and outputs RData to the packet buffer 100 as SRAMWData.

This allows the data RData read from the source address SourceAdr of the pipe region PIPEe to be written into the destination address DestAdr as SRAMWData, as shown in FIGS. 5A and 5B, whereby the copy processing is implemented.

6. Pointer Moving Processing 6.1 Pointer Moving Processing using Relative Address In this embodiment of the present invention, the pointer moving processing during reconstruction is implemented by a method described below. As indicated by H1 in FIG. 12, an absolute address and an absolute read address indicated by the write pointer WPtr and the read pointer RPtr are converted into a relative address and a relative read address relative to the start address StAdr and the end address EnAdr of the pipe region PIPE before reconstruction. Specifically, conversion processing (PtrConve1) into the relative addresses expressed by "RelWPtr=WPtr−StAdr" and "RelRPtr=EnAdr−RPtr" is performed.

Figure 12:
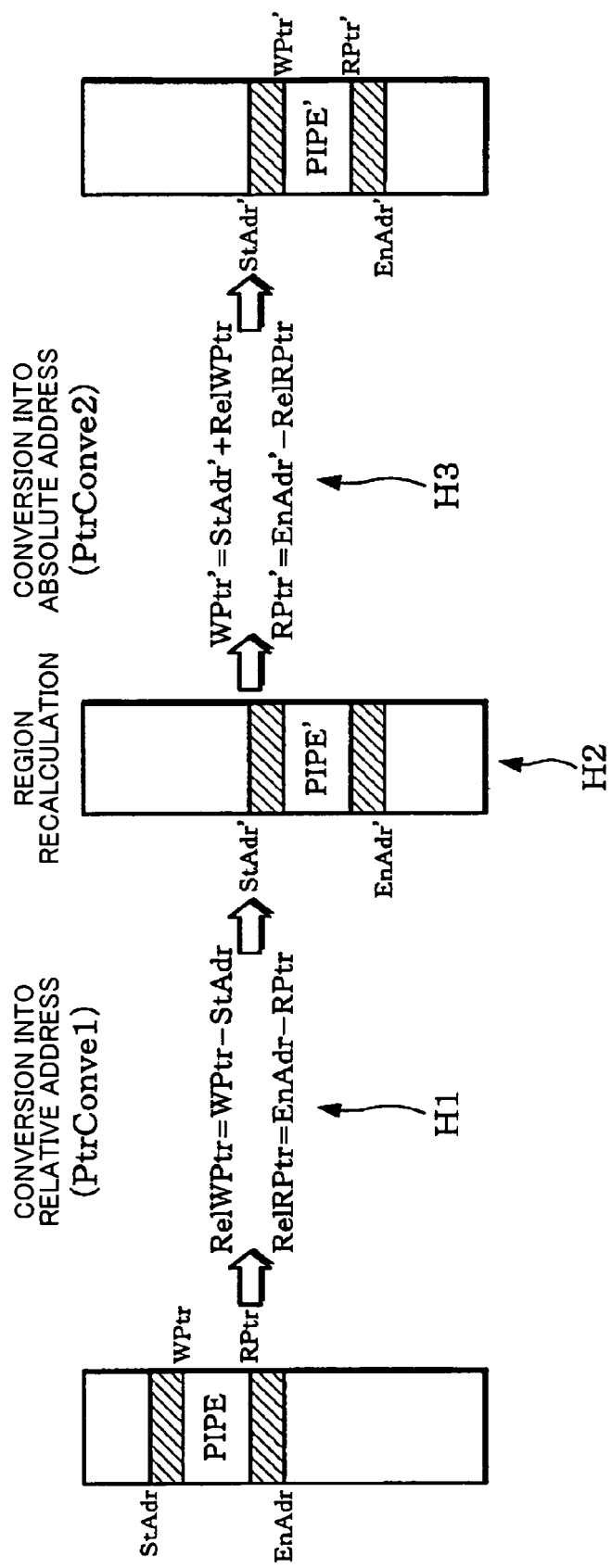
FIG. 12 is a diagram for illustrating pointer moving processing according to one embodiment of the present invention.

As indicated by H2 in FIG. 12, region recalculation processing of the pipe region PIPE' after reconstruction is performed to determine the start address StAdr' and the end address EnAdr' of the pipe region PIPE'. As indicated by H3, the relative address and the relative read address are converted into the absolute address and the absolute read address based on the start address StAdr' and the end address EnAdr' of the pipe region PIPE' after reconstruction. Specifically, conversion processing (PtrConve2) into the absolute addresses expressed by "WPtr'=StAdr'+RelWPtr" and "RPtr'=EnAdr'−RelRPtr" is performed to implement the pointer moving processing.

Therefore, since the absolute address can be used as the address of the pointer during the normal operation other than the reconstruction processing, the number of operations can be reduced, whereby the processing speed can be increased. Moreover, the scale of the address generation circuit can be reduced. Furthermore, since the conversion processing into the relative addresses and the conversion processing into the absolute addresses can be implemented by using one circuit as described later, the scale of the circuit can be reduced.

6.2 Configuration

Figure 13:
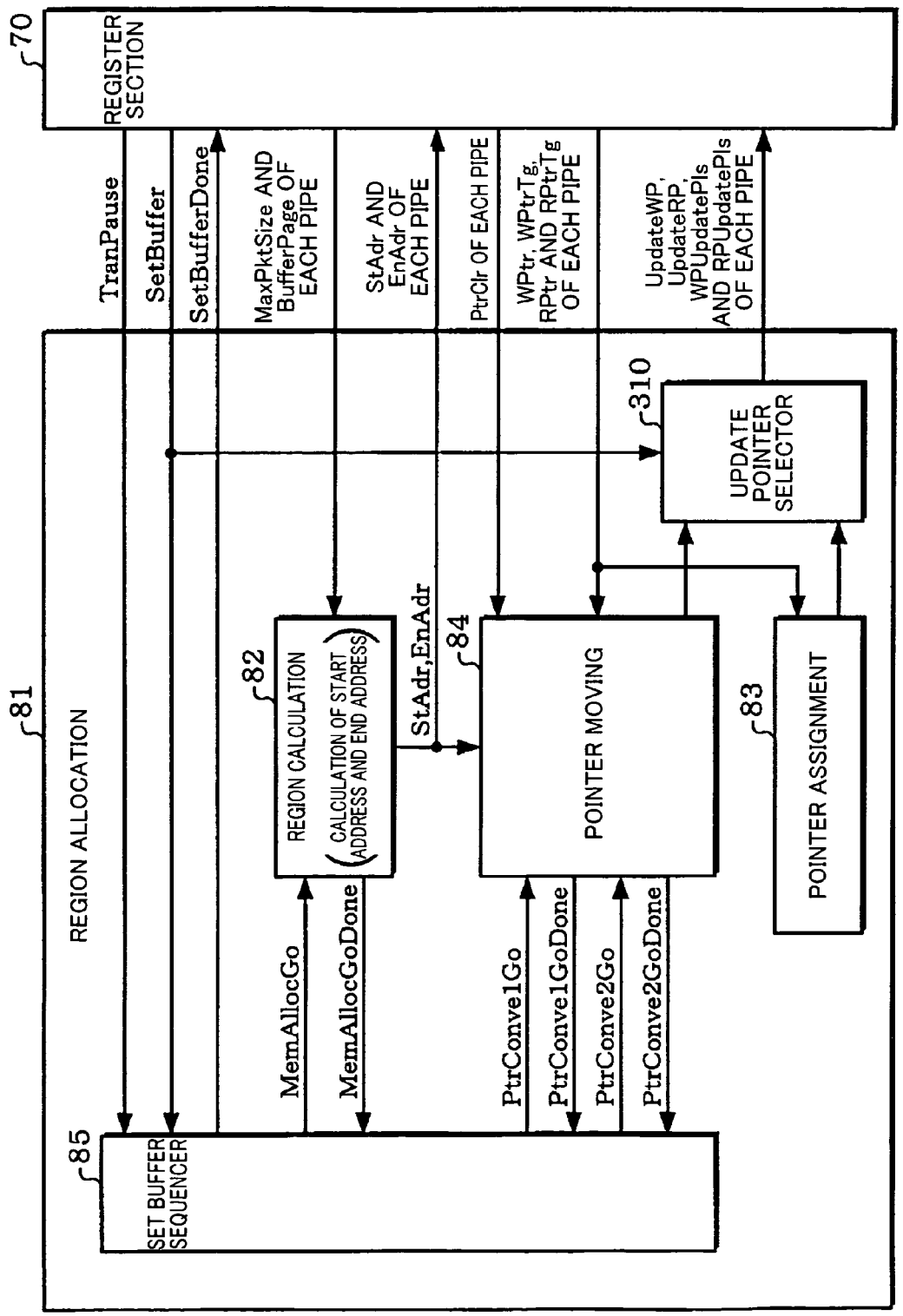
FIG. 13 is a diagram showing detailed configuration of a region allocation circuit.

FIG. 13 shows the configuration of the region allocation circuit 81 for implementing the pointer moving processing according to this embodiment of the present invention. When TranPause and SerBuffer are asserted, the set buffer sequencer 85 starts the sequence of the set buffer processing. When the set buffer sequencer 85 asserts a signal PtrConve1Go, the pointer moving circuit 84 performs the conversion processing into the relative addresses indicated by H1 in FIG. 12 based on the pointer information WPtr and RPtr (absolute address information) and WPtrTg and RPtrTg (toggle bits) from the registers in the register section 70 to update the pointers. The updated pointer information (relative address information) is written into the registers in the register section 70 as UpdateWP and UpdateRP through an update pointer selector 310. When the signal PtrClr is asserted, the pointer clear processing (processing of returning the pointers to the start address or the end address) is performed. WPUpdatePls and RPUpdatePls are pulse signals for writing the pointer information into the registers in the register section 70.

When the set buffer sequencer 85 asserts a signal MemAllocGo, the region calculation circuit 82 performs calculation processing for region allocation. In more detail, as indicated by H2 in FIG. 12, the region calculation circuit 82 calculates the start address StAdr and the end address EnAdr of the pipe region PIPE' after reconstruction based on MaxPktSize and BufferPage (see FIG. 9A). The resulting start address StAdr and end address EnAdr are written into the registers in the register section 70 and output to the pointer moving circuit 84.

When the set buffer sequencer 85 asserts a signal PtrConve2Go, the pointer moving circuit 84 performs the conversion processing into the absolute addresses indicated by H3 in FIG. 12 based on the pointer information WPtr and RPtr (relative address information) and WPtrTg and RPtrTg (toggle bits) from the registers in the register section 70 to update the pointers. The updated pointer information (absolute address information) is written into the registers in the register section 70 as UpdateWP and UpdateRP through the update pointer selector 310.

The pipe region (buffer region) in this embodiment has a ring buffer structure. The toggle bits WPtrTg and RPtrTg are reversed from "0" to "1" or from "1" to "0" each time the write pointer and the read pointer make one lap of the pipe region. When WPtr coincides with RPtr and WPtrTg coincides with RPtrTg, it is determined that the pipe region is empty of data. When WPtr coincides with RPtr and WPtrTg does not coincide with RPtrTg, it is determined that the pipe region is full of data. The operation sequence at H1 and H3 in FIG. 12 can be determined by using WPtrTg and RPtrTg.

Figure 14:
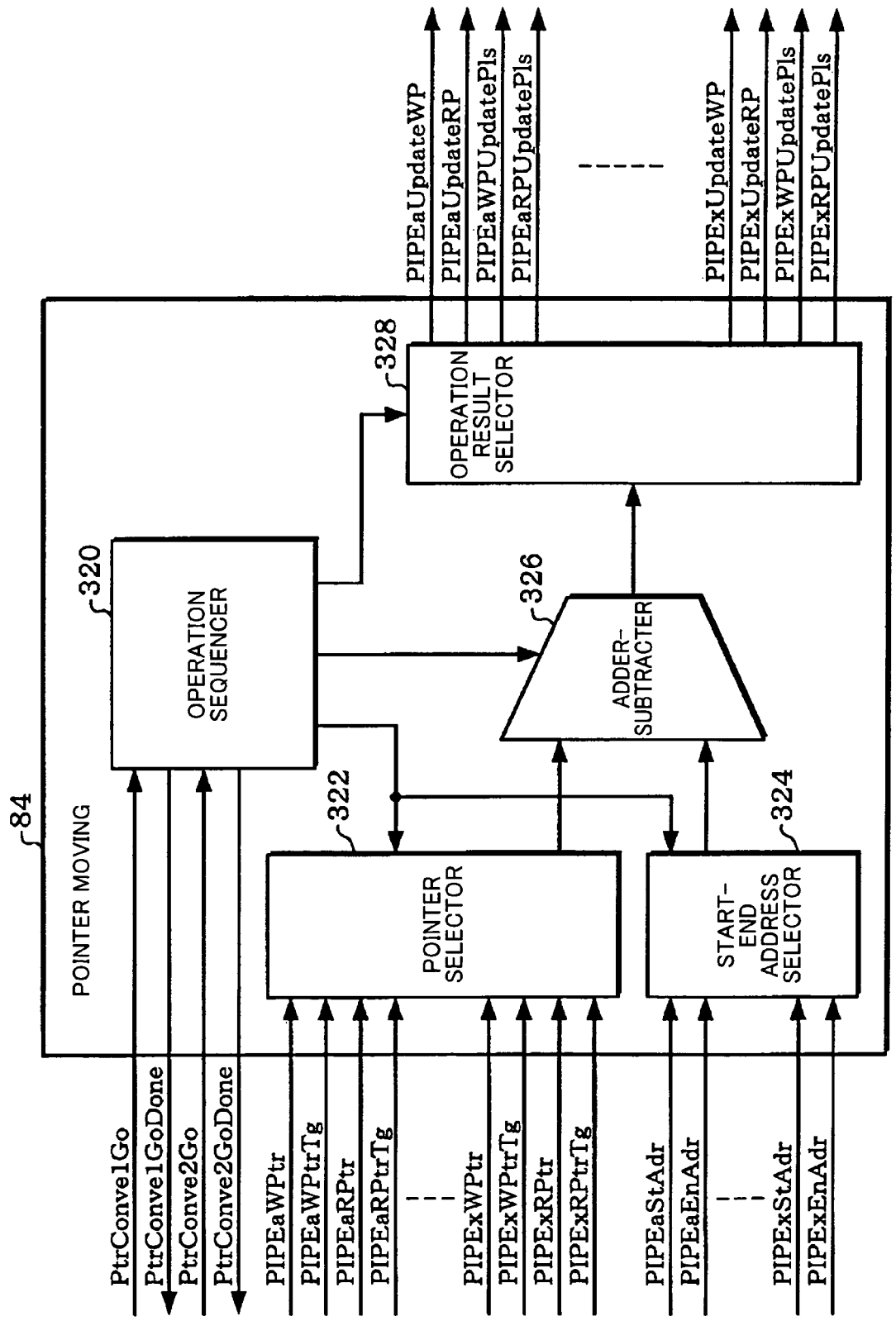
FIG. 14 is a diagram showing detailed configuration of a pointer moving circuit.

FIG. 14 shows the configuration of the pointer moving circuit 84. When PtrConve1Go is asserted, a pointer selector 322 and a start-end address selector 324 select the pointer information and the start-end address information on the processing target pipe region based on a control signal from an operation sequencer 320. An adder-subtracter 326 performs add-subtract processing based on the selected information, whereby the conversion processing into the relative addresses expressed by "RelWPtr 32 WPtr−StAdr" and "RelRPtr=EnAdr−RPtr" as indicated by H1 in FIG. 12 is performed. The updated pointer information (relative address information) is written into the registers in the register section 70 through an operation result selector 328. The above-described processing is performed for all the target pipe regions.

When PtrConve2Go is asserted, the pointer selector 322 and the start-end address selector 324 select the pointer information and the start-end address information on the processing target pipe region based on the control signal from the operation sequencer 320. The adder-subtracter 326 performs the add-subtract processing based on the selected information, whereby the conversion processing into the absolute addresses expressed by "WPtr'=StAdr'+RelWPtr" and "RPtr'=EnAdr'−RelRPtr" as indicated by H3 in FIG. 12 is performed. The updated pointer information (absolute address information) is written into the registers in the register section 70 through the operation result selector 328. The above-described processing is performed for all the target pipe regions.

6.3 Operation

Figure 15:
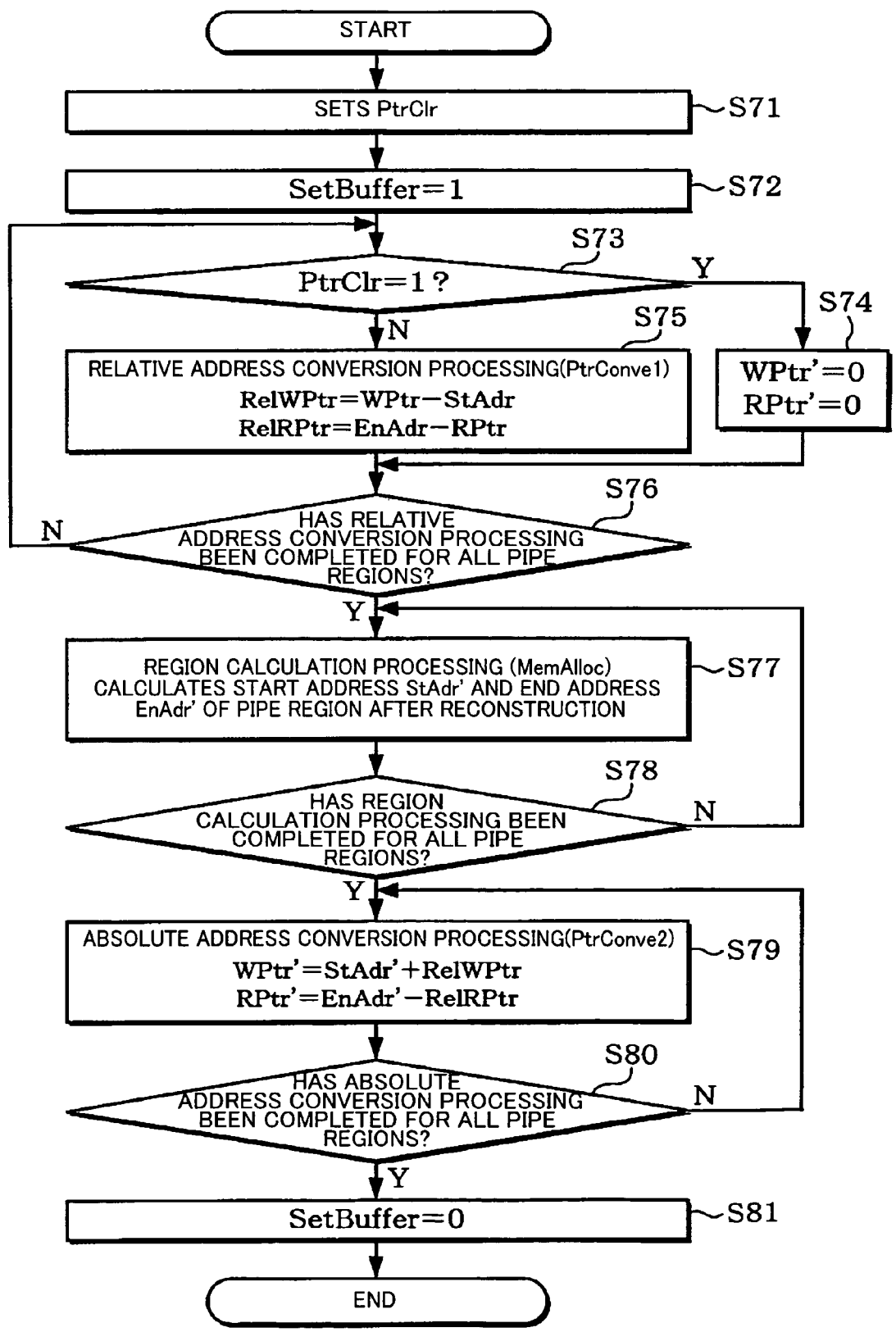
FIG. 15 is a flowchart for illustrating the operation during pointer moving processing.

The operation during the pointer moving processing is described below by using a flowchart shown in FIG. 15 and a timing waveform chart shown in FIG. 16. The firmware sets PtrClr for each pipe region, and SetBuffer is set at "1" as indicated by I1 in FIG. 16 (steps S71 and S72).

It is determined whether or not PtrClr of the processing target pipe region is set at "1" (step S72). When PtrClr is set at "1", the pointer clear processing is performed (step S74). Specifically, the relative address values are set at "0" as expressed by "WPtr'=0" and "RPtr'=0".

Figure 16:
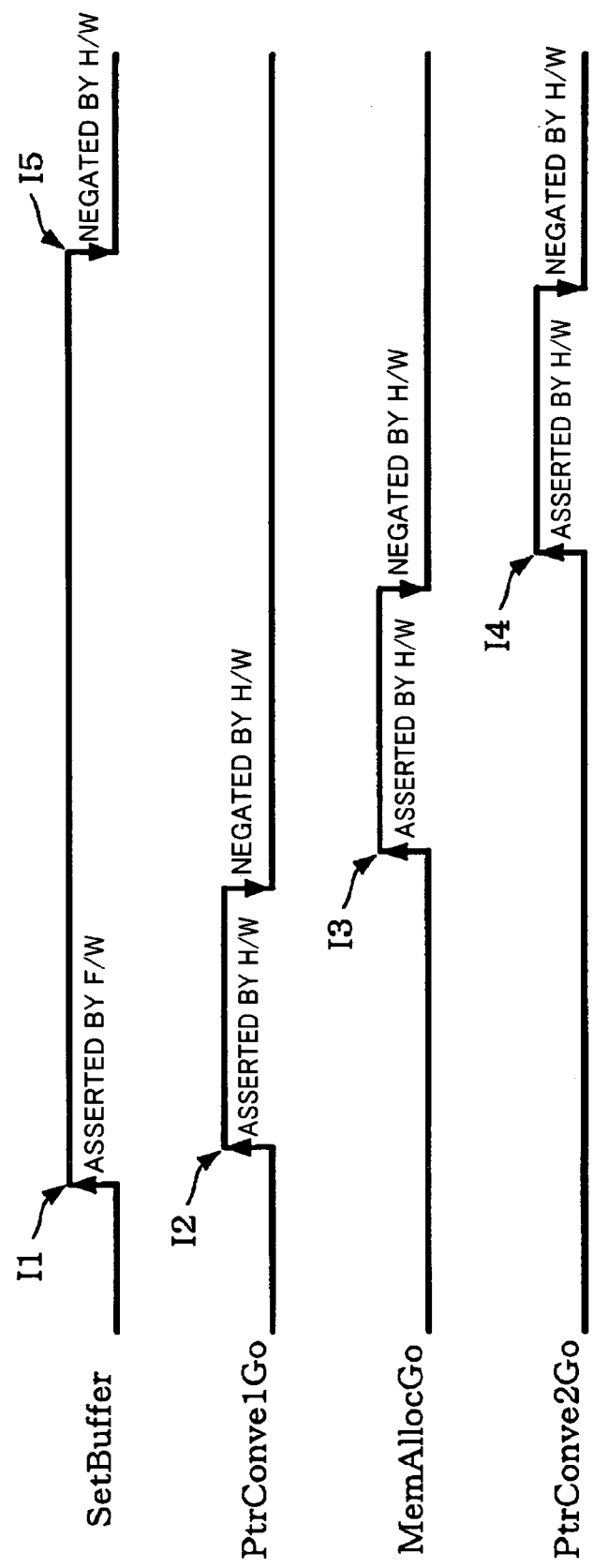
FIG. 16 is a timing waveform chart for illustrating the operation during pointer moving processing.

When PtrClr is not set at "1", PtrConve1Go is asserted as indicated by 12 in FIG. 16, whereby the relative address conversion processing indicated by H1 in FIG. 12 is performed (step S75). It is determined whether or not the relative address conversion processing has been completed for all the pipe regions (step S76). If the relative address conversion processing has not been completed, the processing returns to the step S73.

MemAllocGo is asserted as indicated by 13 in FIG. 16, whereby the region calculation processing indicated by H2 in FIG. 12 is performed (step S77). It is determined whether or not the region calculation processing has been completed for all the pipe regions (step S78). If the region calculation processing has not been completed, the processing returns to the step S77.

PtrConve2Go is asserted as indicated by 14 in FIG. 16, whereby the absolute address conversion processing indicated by H3 in FIG. 12 is performed (step S79). It is determined whether or not the absolute address conversion processing has been completed for all the pipe regions (step S80). If the absolute address conversion processing has not been completed, the processing returns to the step S79. If the absolute address conversion processing has been completed, the hardware circuit sets SetBuffer at "0" as indicated by 15 in FIG. 16 (step S81).

7. Transfer Condition Register (or Common Register)

Figure 17:
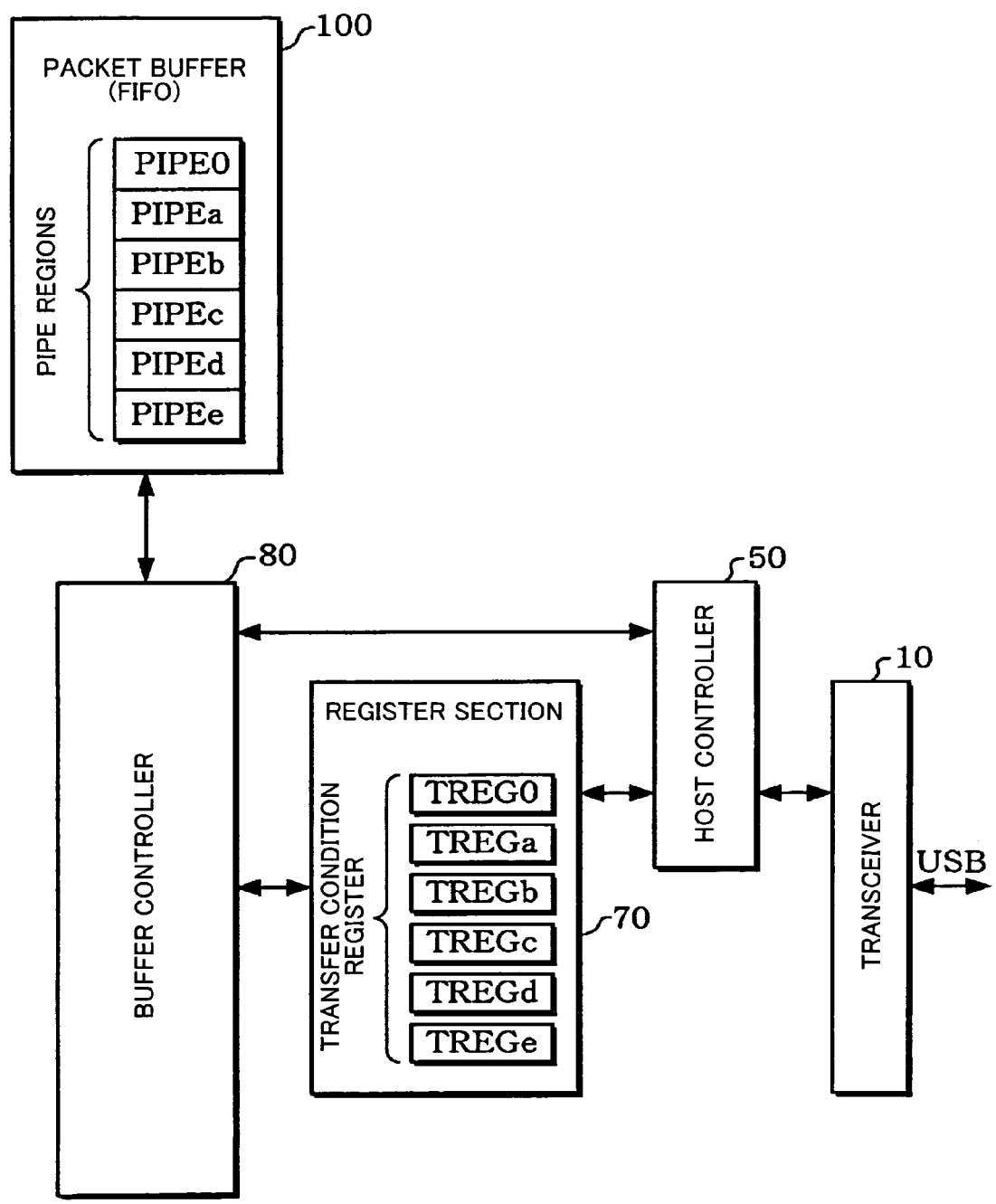
FIG. 17 is a diagram for illustrating the operation of the data transfer control device during a host operation.

In this embodiment, the transfer condition information on data transfer performed between the pipe regions PIPE0 to PIPEe and the endpoints is set in transfer condition registers TREG0 to TREGe during the host operation, as shown in FIG. 17. Specifically, the transfer condition information on the pipe regions PIPE0, PIPEa, PIPEb, PIPEc, PIPEd, and PIPEe is respectively set (stored) in the transfer condition registers TREG0, TREGa, TREGb, TREGc, TREGd, and TREGe. The transfer condition information is set by the firmware (CPU or processing section), for example.

The host controller 50 (transfer controller in a broad sense) generates transactions to the endpoints based on the transfer condition information set in the transfer condition registers TREG0 to TREGe. The host controller 50 automatically transfers data (packet) between the pipe region and the endpoint corresponding to the pipe region.

Each transfer condition register is thus provided corresponding to each pipe region (buffer region). Pipe transfer (transfer in a given data unit) of each pipe region is automatically performed by the host controller 50 based on the transfer condition information set in each transfer condition register. Therefore, it is unnecessary for the firmware (driver or software) to take part in data transfer control after setting the transfer condition information in the transfer condition registers until the data transfer is completed. An interrupt occurs when the pipe transfer in a given data unit is completed, whereby the firmware is advised of the completion of transfer. This significantly reduces the processing load of the firmware (CPU).

Figure 18:
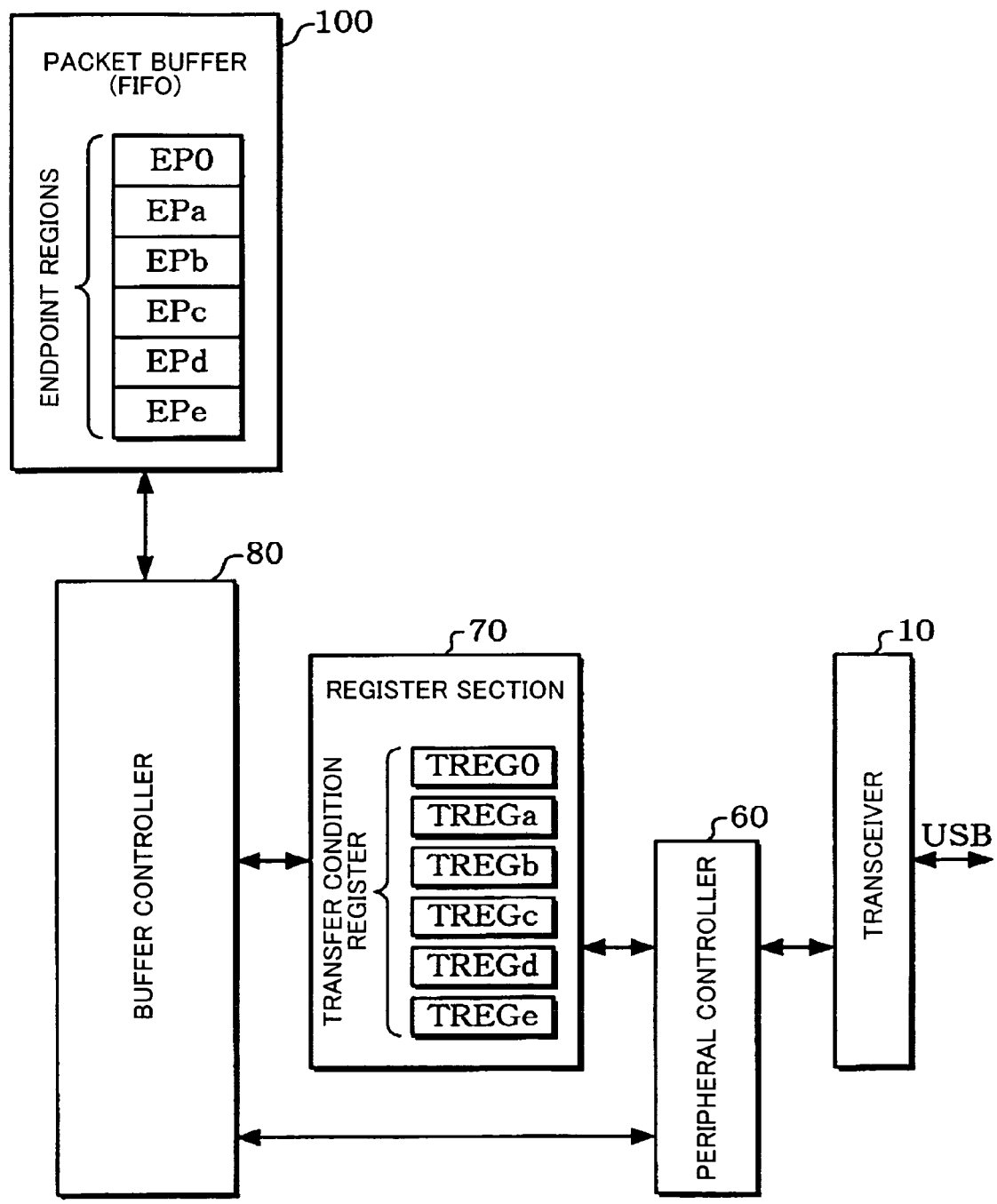
FIG. 18 is a diagram for illustrating the operation of the data transfer control device during a peripheral operation.

Note that the transfer condition information on data transfers performed between the endpoint regions EP0 to EPe and the host is set in the transfer condition registers TREG0 to TREGe during the peripheral operation, as shown in FIG. 18. The peripheral controller 60 (transfer controller in a broad sense) performs data transfer between the endpoint regions and the host based on the transfer condition information set in the transfer condition registers TREG0 to TREGe.

According to this embodiment, the transfer condition registers TREG0 to TREGe are used in common during the host operation and the peripheral operation. This saves resources of the register section 70, whereby the scale of the data transfer control device can be reduced.

FIG. 19 shows the configuration of registers in the register section 70. Some of the registers in the register section 70 may be included in each block (OTGC, HC, PC, Xcvr, and the like).

As shown in FIG. 19, the transfer condition registers (each of TREG0 to TREGe) in the register section 70 include HC/PC common registers (common transfer condition registers) which are used in common during the host operation (HC, PIPE) and the peripheral operation (PC, EP). The transfer condition registers include HC (PIPE) registers (host transfer condition registers) which are used during only the host operation. The transfer condition registers include PC (EP) registers (peripheral transfer condition registers) which are used during only the peripheral operation. The transfer condition registers also include access control registers which are registers for controlling access to the packet buffer (FIFO), and are used in common during the host operation and the peripheral operation.

For example, the host controller 50 (HC) transfers data (packet) based on the transfer condition information set in the HC/PC common registers and the HC registers during the host operation of the dual-role device. The peripheral controller 60 (PC) transfers data (packet) based on the transfer condition information set in the HC/PC common registers and the PC registers during the peripheral operation.

The buffer controller 80 controls access to the packet buffer 100 (generation of read/write address, read/write of data, arbitration between accesses, and the like) based on the common access control registers during the host operation and the peripheral operation.

A data transfer direction (IN, OUT, SETUP, and the like), transfer type (transaction type such as isochronous, bulk, interrupt, and control), endpoint number (number associated with the endpoint of each USB device), and maximum packet size (maximum payload size of a packet which can be transmitted or received by the endpoint; page size) are set in the HC/PC common registers shown in FIG. 19. The number of pages (number of layers of the buffer region) of the buffer region (pipe region or endpoint region) is set in the HC/PC common registers. Information indicating whether or not to use DMA connection (whether or not to use DMA transfer by the DMA handler circuit 112) is set in the HC/PC common registers.

A token issue interval of interrupt transfer (interval for starting interrupt transactions) is set in the HC (PIPE) registers. The number of continuous execution times of transactions (information which sets a transfer ratio between the pipe regions; number of continuous execution times of transactions in each pipe region) is set in the HC (PIPE) registers. A function address (USB address of a function having endpoints) and the total size of data to be transferred (total size of data transferred through each pipe region; data unit such as IRP) are set in the HC (PIPE) registers. A start instruction for automatic transactions (instruction requesting the host controller to start automatic transaction processing) is set in the HC (PIPE) registers. An instruction for an automatic control transfer mode (instruction for a mode which automatically generates transactions in a setup stage, data stage, and status stage of control transfer) is also set in the HC (PIPE) registers.

Endpoint enable (instruction for enabling or disabling endpoint) and handshake designation (designation of a handshake performed in each transaction) are set in the PC (EP) register.

A buffer I/O port (I/O port when performing PIO transfer by the CPU) is set in the common access control register for the packet buffer (FIFO). Buffer full/empty (notification of full/empty of each buffer region) and a remaining buffer data size (remaining data size of each buffer region) are also set in the common access control register. The register section 70 includes interrupt-related registers, block-related registers, and DMA control registers, as shown in FIG. 19.

In this embodiment, the registers used in common during the host operation and the peripheral operation (HC/PC common registers and common access control registers) are provided in the register section 70. This enables the scale of the register section 70 to be decreased in comparison with the case of separately providing registers for the host operation and registers for the peripheral operation. Moreover, the access addresses of the common registers from the firmware (processing section) which operates on the CPU can be the same during the host operation and the peripheral operation. Therefore, the firmware can manage the common registers by using the single addresses, whereby the processing of the firmware can be simplified.

The transfer conditions characteristic of transfer during the host operation (PIPE) and transfer during the peripheral operation (EP) can be set by providing the HC registers and the PC registers. For example, a token for interrupt transfer can be issued at a desired interval during the host operation by setting the token issue interval. The transfer ratio between the pipe regions can be arbitrarily set during the host operation by setting the number of continuous execution times. The size of data automatically transferred through the pipe regions during the host operation can be arbitrarily set by setting the total size. The firmware can issues instructions for start of automatic transactions and on/off of the automatic control transfer mode during the host operation.

8. Automatic Transaction

Figure 20:
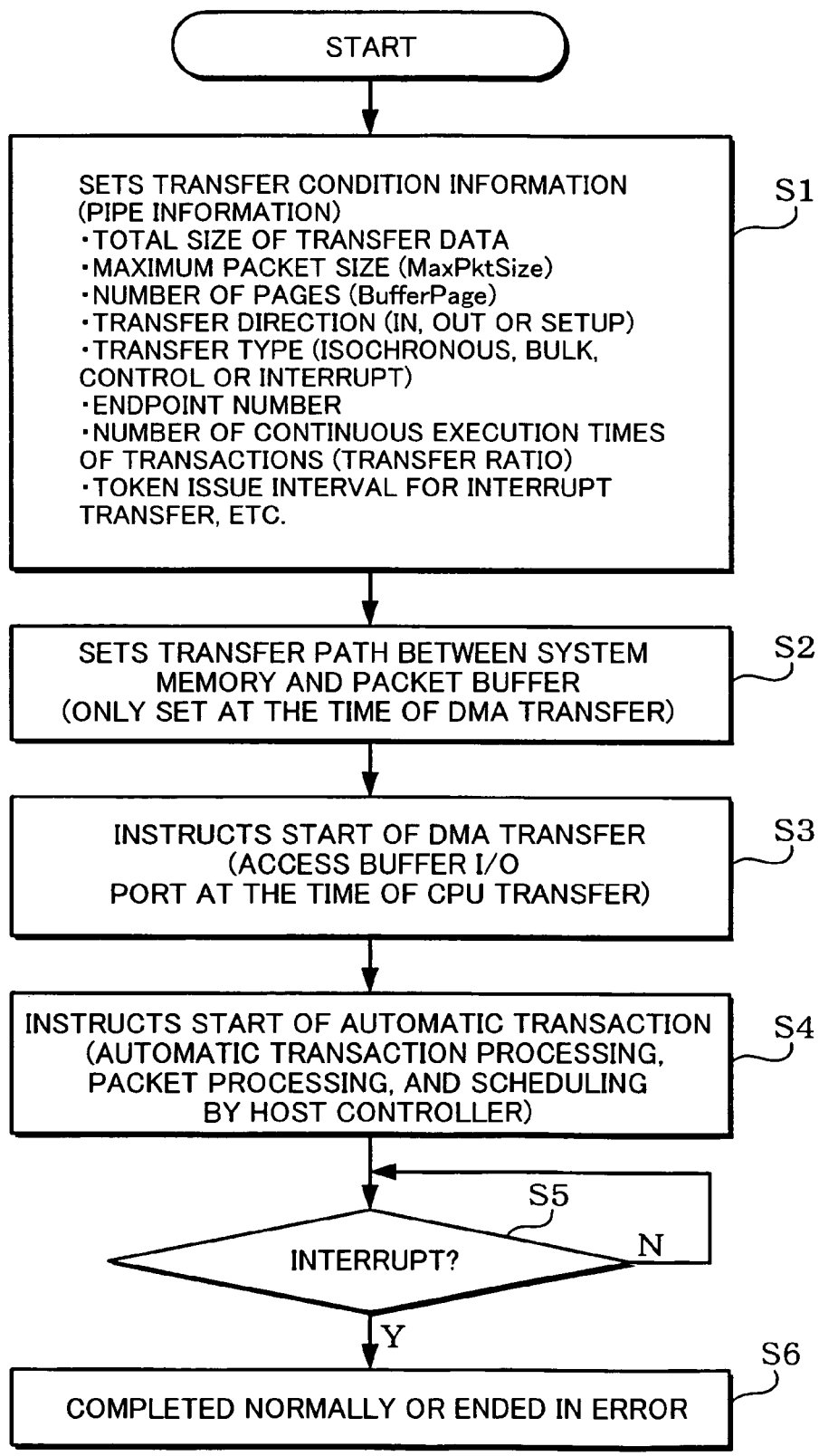
FIG. 20 is a flowchart for illustrating firmware processing.

FIG. 20 is a flowchart showing an example of firmware processing during automatic transaction (IN, OUT) processing of the host controller 50.

The firmware (processing section or driver) sets the transfer condition information (pipe information) in the transfer condition registers described with reference to FIG. 19 and the like (step S1). In more detail, the firmware sets the total size of data to be transferred, maximum packet size (MaxPktSize), number of pages (BufferPage), transfer direction (IN, OUT, or SETUP), transfer type (isochronous, bulk, control, or interrupt), endpoint number, number of continuous execution times of transactions (transfer ratio) in the pipe region, token issue interval for interrupt transfer, and the like in the transfer condition registers.

The firmware sets a transfer path between the external system memory and the packet buffer 100 (step S2). Specifically, the firmware sets the DMA transfer path through the DMA handler circuit 112 shown in, FIG. 2.

The firmware issues instructions for start of DMA transfer (step S3). Specifically, the firmware asserts a DMA transfer start instruction bit of the DMA control register shown in FIG. 19. In transfer by the CPU, the packet buffer 100 can be accessed by accessing the buffer I/O port shown in FIG. 19.

The firmware issues instructions for start of automatic transactions (step S4). Specifically, the firmware asserts an automatic transaction start instruction bit of the HC register (pipe register) shown in FIG. 19. This allows the host controller 50 to perform automatic transaction processing, packet processing (assembling/disassembling of packet), and scheduling processing. Specifically, the host controller 50 automatically transfers data specified by the total size in a direction (IN or OUT) specified by the transfer direction by using the packet with a payload of the maximum packet size.

The order of the processing in the step S3 and the processing in the step S4 is not limited. The start instruction for DMA transfer may be issued after the start instruction for automatic transactions.

The firmware waits for occurrence of an interrupt which notifies of the completion of pipe transfer (step S5). When an interrupt occurs, the firmware checks the interrupt status (factor) of the interrupt-related registers shown in FIG. 19. The processing is then completed normally or ends in error (step S6).

As described above, the firmware merely sets the transfer condition information for each pipe region (step S1), instructs start of DMA transfer (step S3), and instructs start of automatic transactions (step S4). The subsequent data transfer processing is automatically performed by the hardware circuit of the host controller 50. Therefore, the processing load of the firmware is reduced in comparison with the method conforming to the OHCI, whereby a data transfer control device suitable for an portable instrument including a low performance CPU can be provided.

Figure 21:
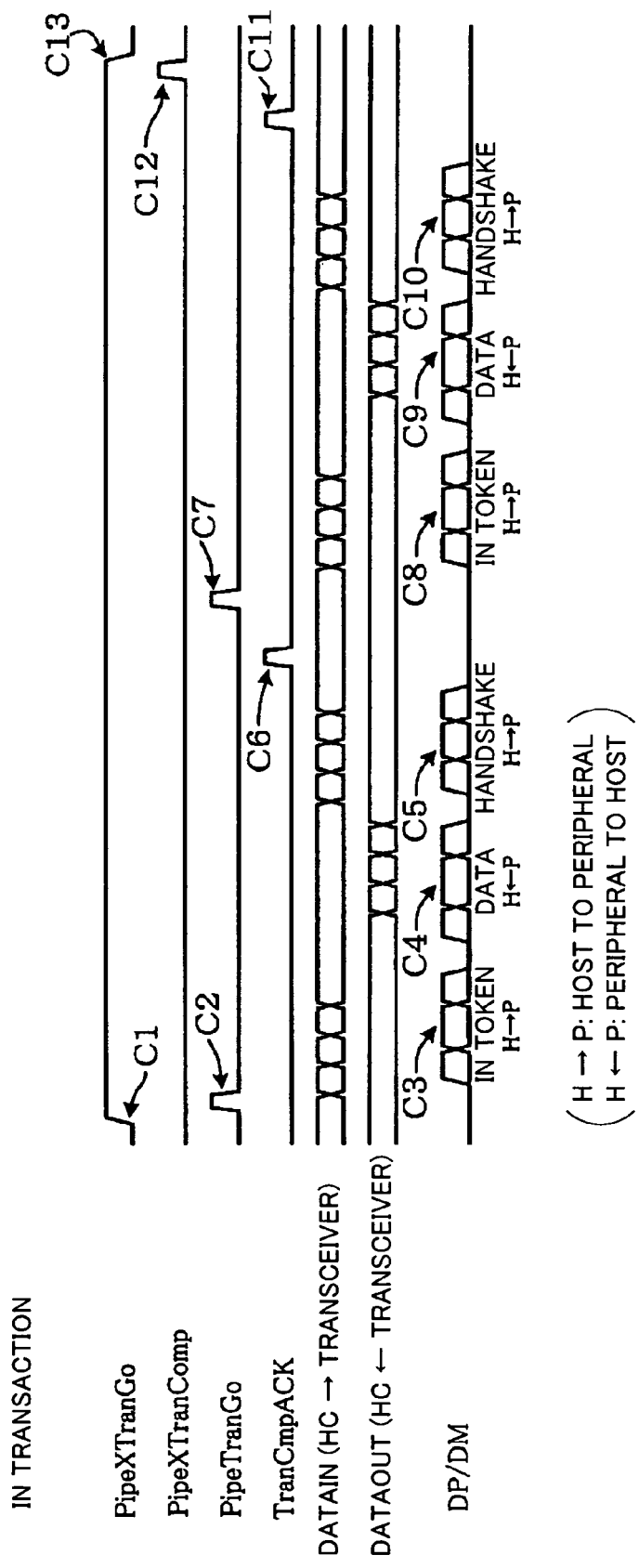
FIG. 21 is a signal waveform chart showing automatic IN transaction processing.
Figure 22:
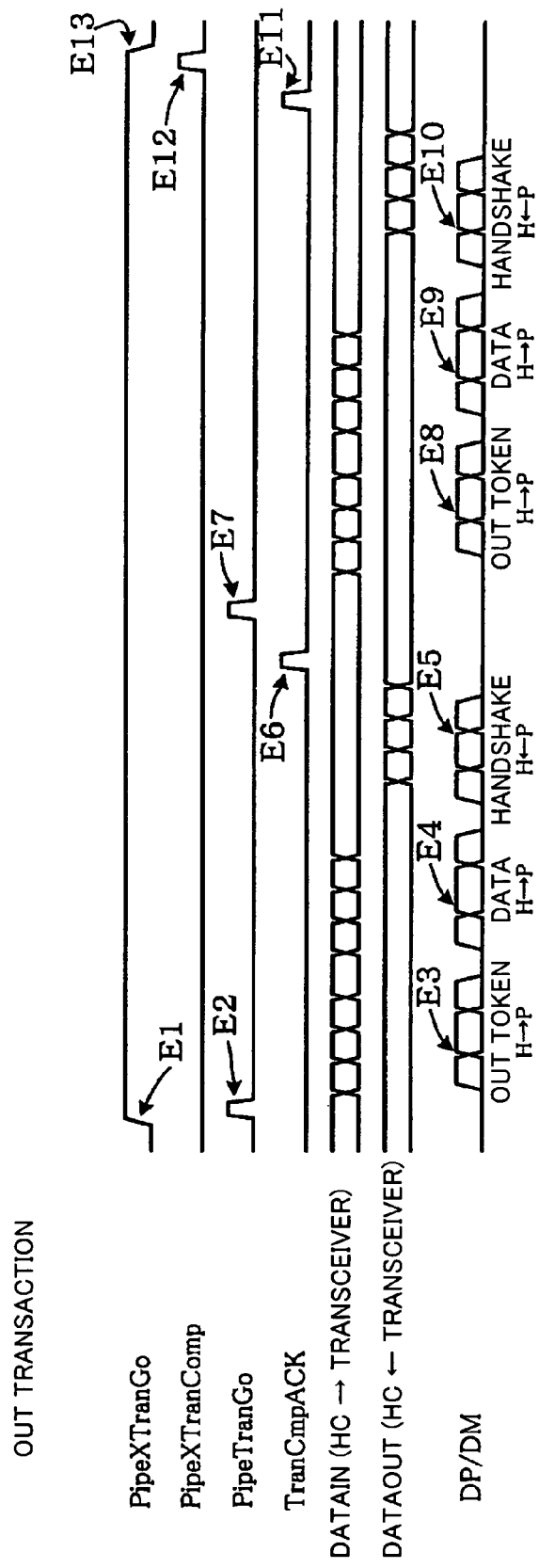
FIG. 22 is a signal waveform chart showing automatic OUT transaction processing.

FIGS. 21 and 22 show examples of a signal waveform during automatic transaction processing by the host controller 50. In FIGS. 21 and 22, "H→P" indicates that the packet is transferred from the host to the peripheral, and "H←P" indicates that the packet is transferred from the peripheral to the host.

FIG. 21 is a signal waveform in the case of IN transactions (transfer type is IN). When the firmware instructs start of automatic transactions in the step S4 shown in FIG. 20, PipeXTranGo (transfer request signal for PipeX from the firmware) is asserted as indicated by C1 shown in FIG. 21. This allows the host controller 50 to start automatic transaction processing for PipeX (X=0 to e).

When PipeTranGo (transfer request signal from an HC sequence management circuit in the host controller 50) is asserted as indicated by C2, the host controller 50 generates an IN token packet and transfers the packet to the peripheral through the USB as indicated by C3. When an IN data packet is transferred from the peripheral to the host controller 50 as indicated by C4, the host controller 50 generates a handshake packet (ACK) and transfers the handshake packet to the peripheral as indicated by C5. This causes TranCmpACK to be asserted as indicated by C6.

When PipeTranGo is asserted as indicated by C7, packet transfers indicated by C8, C9, and C10 are performed, whereby TranCmpACK is asserted as indicated by C11. This causes PipeXTranComp (transfer completion notification signal in a data unit of IRP to the firmware) to be asserted as indicated by C12. The firmware is notified of the completion of transfer for the pipe by the interrupt of PipeXTranComp.

When PipeXTranComp is asserted, PipeXTranGo is negated as indicated by C13, thereby indicating that the pipe is in a non-transfer state.

FIG. 22 is a signal waveform in the case of OUT transactions (transfer type is OUT). When the firmware issues instructions for start of automatic transactions, PipeXTranGo is asserted as indicated by E1 and PipeTranGo is asserted as indicated by E2. The host controller 50 transfers an OUT token packet to the peripheral as indicated by E3, and transfers an OUT data packet as indicated by E4. When the handshake packet (ACK) is returned from the peripheral as indicated by E5, TranCmpACK is asserted as indicated by E6.

When PipeTranGo is asserted as indicated by E7, packet transfers indicated by E8, E9, and E10 are performed, whereby TranCmpACK is asserted as indicated by E11. PipeXTranComp then is asserted as indicated by E12. The firmware is notified of the completion of transfer for the pipe by the interrupt of PipeXTranComp. When PipeXTranComp is asserted, PipeXTranGo is negated as indicated by E13.

9. Electronic Instrument

Figure 23:
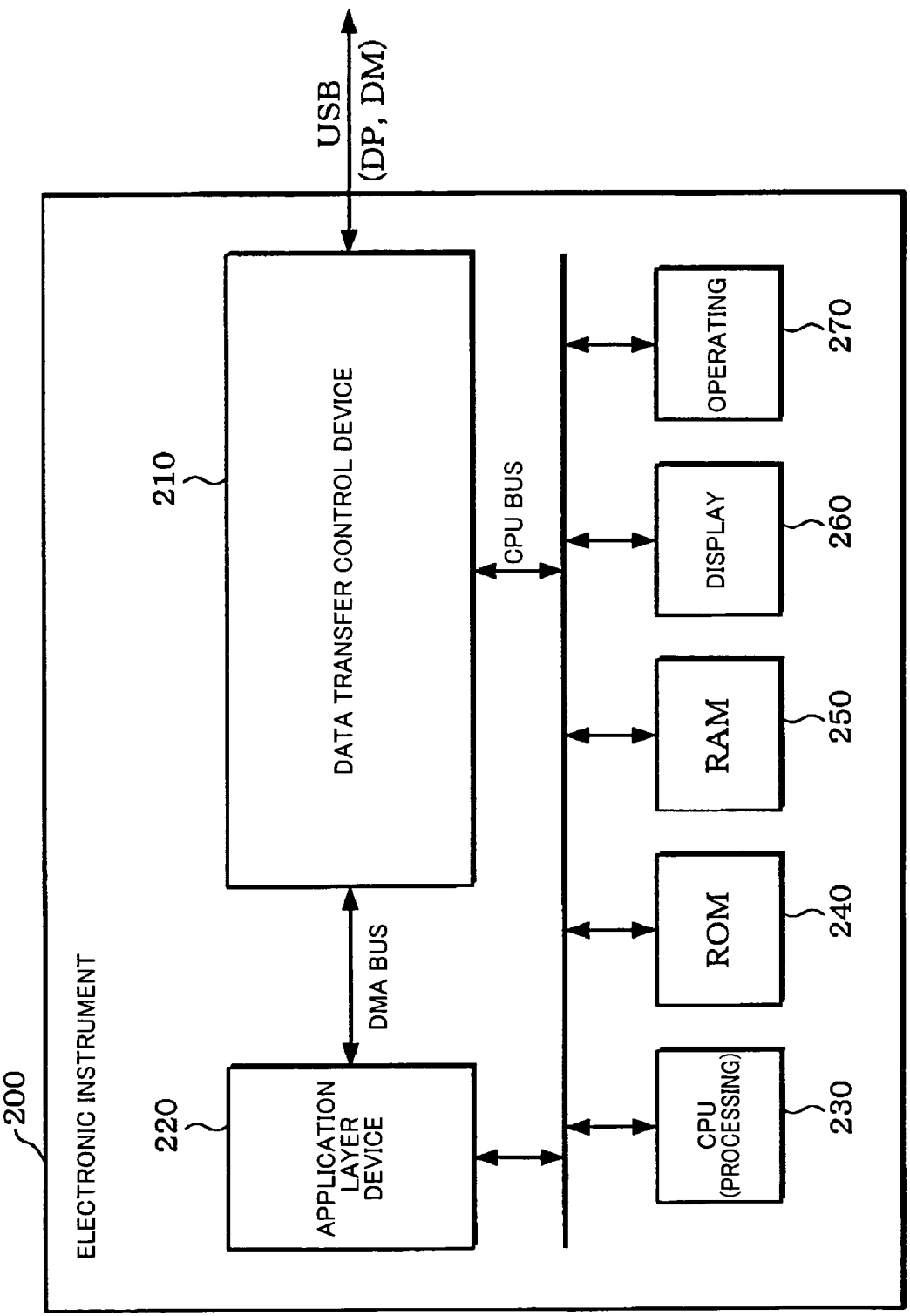
FIG. 23 is a block diagram showing the configuration an electronic instrument.

FIG. 23 shows the configuration of an electronic instrument including the data transfer control device according to this embodiment. This electronic instrument 200 includes a data transfer control device 210 described in this embodiment, an application layer device 220 formed by ASIC or the like, a CPU 230, a ROM 240, a RAM 250, a display section 260, and an operating section 270. Note that part of the functional blocks may be omitted.

The application layer device 220 is a device which controls a hard disk drive, an optical disk drive, or a printer, a device which includes an MPEG encoder and an MPEG decoder, or the like. The CPU 230 (processing section) controls the data transfer control device 210 and the entire electronic instrument. The ROM 240 stores a control program and various types of data. The RAM 250 functions as a work area and a data storage region for the CPU 230 and the data transfer control device 210. The display section 260 displays various types of information to the user. The operating section 270 allows the user to operate the electronic instrument.

In FIG. 23, a DMA bus and a CPU bus are separated. However, the DMA bus and the CPU bus may be a common bus. The CPU 230 may be included in the data transfer control device 210, or a CPU which controls the data transfer control device 210 and a CPU which controls the electronic instrument may be provided separately. As examples of electronic instruments to which this embodiment can be applied, optical disk (CD-ROM and DVD) drives, magneto-optical (MO) disk drives, hard disk drives, TVs, TV tuners, VTRs, video cameras, audio devices, telephones, projectors, personal computers, electronic notebooks, word processors, and the like can be given.

The present invention is not limited to this embodiment, and various modifications can be made within the scope of the invention.

For example, the configuration of the data transfer control device according to the present invention is not limited to the configuration described with reference to FIG. 2 and others, and various modifications are possible. For example, the present invention may be applied to a data transfer control device in which the configuration including the OTG controller 20, the HC/PC switch circuit 30, the peripheral controller 60, and the like shown in FIG. 2 is omitted and which does not have a peripheral function and has only a simple host function.

The terms (OTG controller, CPU and firmware, host controller and peripheral controller, USB, pipe region and endpoint region, and the like) cited in the description in the specification and the drawings as the terms in a broad sense (state controller, processing section, transfer controller, bus, buffer region, and the like) may be replaced by the terms in a broad sense in another description in the specification and the drawings.

Part of requirements of any claim of the present invention could be omitted from a dependent claim which depends on that claim. Moreover, part of requirements of any independent claim of the present invention could be made to depend on any other independent claim.

Note that although the above description concerns the embodiment conforming to the USB OTG standard, the present invention is not limited to that embodiment. For example, the present invention may be applied to data transfer conforming to a standard based on the same idea as the OTG standard or a standard developed from the OTG standard.

There can be provided following features relating to the present invention.

According to one embodiment of the present invention, there is provided a data transfer control device for data transfer through a bus, the data transfer control device comprising:

a buffer controller which allocates a plurality of pipe regions in a packet buffer and controls access to the allocated packet buffer, each of the pipe regions storing data which is transferred between each of the pipe regions and corresponding one of endpoints; and a transfer controller which controls data transfer between the pipe region and a corresponding endpoint, wherein:

the data transfer control device performs pause processing in which data transfer between the pipe region and a corresponding endpoint is paused;

the data transfer control device performs reconstruction processing of the pipe regions after the completion of the pause processing, the reconstruction processing including at least one of delete processing of the allocated pipe region, addition processing of a new pipe region, and size-change processing of the allocated pipe region; and the data transfer control device resumes the paused data transfer after the reconstruction processing of the pipe regions.

In this data transfer control device, when a pause instruction is issued from a processing section, data transfer is temporarily paused in the middle of the data transfer. After the pause processing of data transfers for all the pipe regions has been completed (there may be some exceptions), the reconstruction processing of the pipe regions is performed. The reconstruction processing includes processing of deleting the existing pipe regions (or buffer regions), processing of adding a new pipe region, and processing of changing the size of the existing pipe regions. The reconstruction processing may include processing of copying (or saving or moving) data in the pipe regions which exists before and after reconstruction, processing of allocating the empty area in the packet buffer to another pipe region by deleting the pipe regions, processing of changing the relationship between the logical address and the physical address of the pipe regions, and the like. In this data transfer control device, the data transfer which has been paused is resumed after the completion of the reconstruction processing, whereby the remaining data transfer is performed. According to this data transfer control device, since the pipe regions can be reconstructed without waiting for completion of the data transfer for the pipe regions, processing efficiency can be improved.

The data transfer control device may further comprise:

a register which stores instruction information for the pause processing of data transfer; and a register which stores information indicating the completion of the pause processing of all the pipe regions.

Reconstruction of the pipe regions can be started after confirming the completion of the pause processing by providing the above registers (or instruction means or notification means).

When a first pipe region allocated in the packet buffer corresponding a first endpoint before the reconstruction processing is allocated again after the reconstruction processing, the data transfer control device may perform copy processing in which data is read from the first pipe region before the reconstruction processing and the read data is written into the first pipe region after the reconstruction processing.

This enables to prevent the data in the first pipe region from being broken (or erased). The copy processing may be performed for only the first pipe region in which the start address and the end address before reconstruction are different from the start address and the end address after reconstruction.

According to one embodiment of the present invention, there is provided a data transfer control device for data transfer through a bus, the data transfer control device comprising:

a buffer controller which allocates a plurality of pipe regions in a packet buffer and controls access to the allocated packet buffer, each of the pipe regions storing data which is transferred between each of the pipe regions and corresponding one of endpoints; and a transfer controller which controls data transfer between the pipe region and a corresponding endpoint, wherein:

the data transfer control device performs reconstruction processing which includes at least one of delete processing of the allocated pipe region, addition processing of a new pipe region, and size-change processing of the allocated pipe region; and when a first pipe region allocated in the packet buffer corresponding a first endpoint before the reconstruction processing is allocated again after the reconstruction processing, the data transfer control device performs copy processing in which data is read from the first pipe region before the reconstruction processing and the read data is written into the first pipe region after the reconstruction processing.

When the number of the endpoints has changed, for example, the reconstruction processing of the pipe regions (or buffer regions) is performed. Since the copy processing of the data in the first pipe region is performed in the reconstruction processing, the data in the first pipe region can be prevented from being broken (or erased).

In the data transfer control device, when a start address of the first pipe region after the reconstruction processing is greater than a start address of the first pipe region before the reconstruction processing, data may be read from the first pipe region before the reconstruction processing while decrementing a source address which is a read address of the first pipe region before the reconstruction processing, and the read data may be written into the first pipe region after the reconstruction processing while decrementing a destination address which is a write address of the first pipe region after the reconstruction processing; and when the start address of the first pipe region after the reconstruction processing is smaller than the start address of the first pipe region before the reconstruction processing, data may be read from the first pipe region before the reconstruction processing while incrementing the source address, and the read data may be written into the first pipe region after the reconstruction processing while incrementing the destination address.

This implements the copy processing in which the data read from the first pipe region before reconstruction is written into the first pipe region after reconstruction while preventing the data in the first pipe region before reconstruction from being overwritten.

The data transfer control device may comprise:

a reconstruction address generation circuit which generates a source address which is a read address of the first pipe region before the reconstruction processing, generates a destination address which is a write address of the first pipe region after the reconstruction processing, selects one of the source address and the destination address, and outputs a selected address as a reconstruction address;

an address selector which selects one of the reconstruction address from the reconstruction address generation circuit, an access address from the transfer controller, an access address from a processing section which controls the data transfer control device and an access address from an application layer device, and then outputs a selected address to the packet buffer;

a latch circuit which latches data read from the packet buffer; and a write data selector which selects one of the data latched by the latch circuit, write data from the transfer controller, write data from the processing section and write data from the application layer device, and then outputs a selected data to the packet buffer.

The data transfer control device may comprise:

a register which stores an initial value of a source address which is a read address of the first pipe region before the reconstruction processing;

a register which stores an initial value of a destination address which is a write address of the first pipe region after the reconstruction processing; and a register which stores instruction information which instructs to increment or decrement the source address and the destination address.

Processing efficiency can be improved by assigning different roles to the data transfer control device and the processing section by providing such registers (setting means and instruction means).

The data transfer control device may control a write pointer indicating a write address of data in each of the pipe regions and a read pointer indicating a read address of data in each of the pipe regions; and may perform moving processing of the write pointer and the read pointer of a first pipe region so that the write pointer and the read pointer after the reconstruction processing respectively indicate locations corresponding to the write address and the read address of data in the first pipe region before the reconstruction processing.

This enables data transfer to be appropriately resumed from where the data transfer has paused after reconstruction of the pipe region.

The data transfer control device may comprise:

a register which stores instruction information which instructs switching between: a mode in which the write pointer and the read pointer are moved so that the write pointer and the read pointer after the reconstruction processing respectively indicate locations corresponding to the write address and the read address of data in the first pipe region before the reconstruction processing; and a mode in which the write pointer and the read pointer are cleared so that the write pointer and the read pointer respectively indicate the start address and the end address of the first pipe region after the reconstruction processing.

This enables a mode in which data transfer is resumed from where the data transfer has paused and a mode in which the pointers are cleared to be switched for each pipe region.

The data transfer control device may perform the moving processing of the write pointer and the read pointer by converting:

an absolute address and an absolute read address indicated by the write pointer and the read pointer into a relative address and a relative read address on the basis of a start address and an end address of the first pipe region before the reconstruction processing; and the relative address and the relative read address into the absolute address and the absolute read address based on a start address and an end address of the first pipe region after the reconstruction processing.

The data transfer control device may comprise a register section which includes a plurality of transfer condition registers in each of which transfer condition information on data transfer between the pipe region and a corresponding endpoint is set; and the transfer controller may automatically generate a transaction for an endpoint based on the transfer condition information set in one of the transfer condition registers, and may automatically transfer data between the pipe region and a corresponding endpoint.

In this data transfer control device, the transfer condition information (or endpoint information or pipe information) on data transfer between each pipe region and a corresponding endpoint is set in each transfer condition register (or pipe register). A transaction for each endpoint is automatically generated based on the transfer condition information set in each transfer condition register, and data is automatically transferred between the pipe regions and the endpoints. This reduces the processing load of the processing section which controls the data transfer control device.

The data transfer control device may comprise a state controller which controls a plurality of states including a state of host operation when the data transfer control device operates as a host, and a state of peripheral operation when the data transfer control device operates as a peripheral, wherein:

the transfer controller may include a host controller which transfers data in the host operation, and a peripheral controller which transfers data in the peripheral operation; and in the host operation, the buffer controller may allocate the pipe regions in the packet buffer, and the host controller may transfer data between the allocated pipe regions and corresponding endpoints.

When a state controlled by the state controller transitions to the state of the host operation, the host controller transfers data in the host operation. When a state controlled by the state controller transitions to the state of the peripheral operation, the peripheral controller transfers data in the peripheral operation. This implements the dual-role device function. In this data transfer control device, the pipe regions are allocated in the packet buffer in the host operation, and data is automatically transferred between the allocated pipe regions and the endpoints. This implements the dual-role device function and reduces the processing load of the processing section during the host operation.

The data transfer control device may perform data transfer conforming to the Universal Serial Bus (USB) On-The-Go (OTG) standard.

According to one embodiment of the present invention, there is provided an electronic instrument comprising:

any of the above data transfer control devices;

a device which performs output processing, fetch processing, or storage processing of data transferred through the data transfer control device and the bus; and a processing section which controls data transfer by the data transfer control device.

What is claimed is:

1. A data transfer control device for data transfer through a bus, the data transfer control device comprising:

a buffer controller which allocates a plurality of pipe regions in a packet buffer and controls access to the allocated packet buffer, each of the pipe regions storing data which is transferred between each of the pipe regions and corresponding one of endpoints; and a transfer controller which controls data transfer between the pipe region and a corresponding endpoint, wherein:

the data transfer control device performs pause processing in which data transfer between the pipe region and a corresponding endpoint is paused;

the data transfer control device performs reconstruction processing of the pipe regions after the completion of the pause processing, the reconstruction processing including at least one of delete processing of the allocated pipe region, addition processing of a new pipe region, and size-change processing of the allocated pipe region; and the data transfer control device resumes the paused data transfer after the reconstruction processing of the pipe regions, wherein:

when a first pipe region allocated in the packet buffer corresponding to a first endpoint before the reconstruction processing is allocated again after the reconstruction processing, the data transfer control device performs copy processing in which data is read from the first pipe region before the reconstruction processing and the read data is written into the first pipe region after the reconstruction processing, wherein:

when a start address of the first pipe region after the reconstruction processing is greater than a start address of the first pipe region before the reconstruction processing, data is read from the first pipe region before the reconstruction processing while decrementing a source address which is a read address of the first pipe region before the reconstruction processing, and the read data is written into the first pipe region after the reconstruction processing while decrementing a destination address which is a write address of the first pipe region after the reconstruction processing; and when the start address of the first pipe region after the reconstruction processing is smaller than the start address of the first pipe region before the reconstruction processing, data is read from the first pipe region before the reconstruction processing while incrementing the source address, and the read data is written into the first pipe region after the reconstruction processing while incrementing the destination address.

2. The data transfer control device as defined in claim 1, further comprising:

a register which stores instruction information for the pause processing of data transfer; and a register which stores information indicating the completion of the pause processing of all the pipe regions.

3. The data transfer control device as defined in claim 1, comprising:

a register section which includes a plurality of transfer condition registers in each of which transfer condition information on data transfer between the pipe region and a corresponding endpoint is set, wherein the transfer controller automatically generates a transaction for an endpoint based on the transfer condition information set in one of the transfer condition registers, and automatically transfers data between the pipe region and a corresponding endpoint.

4. The data transfer control device as defined in claim 1, comprising:

a state controller which controls a plurality of states including a state of host operation when the data transfer control device operates as a host, and a state of peripheral operation when the data transfer control device operates as a peripheral, wherein:

the transfer controller includes a host controller which transfers data in the host operation, and a peripheral controller which transfers data in the peripheral operation; and in the host operation, the buffer controller allocates the pipe regions in the packet buffer, and the host controller transfers data between the allocated pipe regions and corresponding endpoints.

5. The data transfer control device as defined in claim 1, performing data transfer conforming to the Universal Serial Bus (USB) On-The-Go (OTG) standard.

6. An electronic instrument comprising:

the data transfer control device as defined in claim 1;

a device which performs output processing, fetch processing, or storage processing of data transferred through the data transfer control device and the bus; and a processing section which controls data transfer by the data transfer control device.

7. The data transfer control device as defined in claim 1, controlling a write pointer indicating a write address of data in each of the pipe regions and a read pointer indicating a read address of data in each of the pipe regions; and performing moving processing of the write pointer and the read pointer of a first pipe region so that the write pointer and the read pointer after the reconstruction processing respectively indicate locations corresponding to the write address and the read address of data in the first pipe region before the reconstruction processing.

8. The data transfer control device as defined in claim 7, comprising:
a register which stores instruction information which instructs switching between: a mode in which the write pointer and the read pointer are moved so that the write pointer and the read pointer after the reconstruction processing respectively indicate locations corresponding to the write address and the read address of data in the first pipe region before the reconstruction processing; and a mode in which the write pointer and the read pointer are cleared so that the write pointer and the read pointer respectively indicate the start address and the end address of the first pipe region after the reconstruction processing.

9. The data transfer control device as defined in claim 7, performing the moving processing of the write pointer and the read pointer by converting:
an absolute address and an absolute read address indicated by the write pointer and the read pointer into a relative address and a relative read address on the basis of a start address and an end address of the first pipe region before the reconstruction processing; and
the relative address and the relative read address into the absolute address and the absolute read address based on a start address and an end address of the first pipe region after the reconstruction processing.

10. A data transfer control device for data transfer through a bus, the data transfer control device comprising:
a buffer controller which allocates a plurality of pipe regions in a packet buffer and controls access to the allocated packet buffer, each of the pipe regions storing data which is transferred between each of the pipe regions and corresponding one of endpoints;
a transfer controller which controls data transfer between the pipe region and a corresponding endpoint, wherein:
the data transfer control device performs pause processing in which data transfer between the pipe region and a corresponding endpoint is paused;
the data transfer control device performs reconstruction processing of the pipe regions after the completion of the pause processing, the reconstruction processing including at least one of delete processing of the allocated pipe region, addition processing of a new pipe region, and size-change processing of the allocated pipe region;
the data transfer control device resumes the paused data transfer after the reconstruction processing of the pipe regions, wherein,
when a first pipe region allocated in the packet buffer corresponding to a first endpoint before the reconstruction processing is allocated again after the reconstruction processing, the data transfer control device performs copy processing in which data is read from the first pipe region before the reconstruction processing and the read data is written into the first pipe region after the reconstruction processing;
a reconstruction address generation circuit which generates a source address which is a read address of the first pipe region before the reconstruction processing, generates a destination address which is a write address of the first pipe region after the reconstruction processing, selects one of the source address and the destination address, and outputs a selected address as a reconstruction address;
an address selector which selects one of the reconstruction address from the reconstruction address generation circuit, an access address from the transfer controller, an access address from a processing section which controls the data transfer control device and an access address from an application layer device, and then outputs a selected address to the packet buffer;
a latch circuit which latches data read from the packet buffer; and
a write data selector which selects one of the data latched by the latch circuit, write data from the transfer controller, write data from the processing section and write data from the application layer device, and then outputs a selected data to the packet buffer.

11. A data transfer control device for data transfer through a bus, the data transfer control device comprising:
a buffer controller which allocates a plurality of pipe regions in a packet buffer and controls access to the allocated packet buffer, each of the pipe regions storing data which is transferred between each of the pipe regions and corresponding one of endpoints;
a transfer controller which controls data transfer between the pipe region and a corresponding endpoint, wherein:
the data transfer control device performs pause processing in which data transfer between the pipe region and a corresponding endpoint is paused;
the data transfer control device performs reconstruction processing of the pipe regions after the completion of the pause processing, the reconstruction processing including at least one of delete processing of the allocated pipe region, addition processing of a new pipe region, and size-change processing of the allocated pipe region; and
the data transfer control device resumes the paused data transfer after the reconstruction processing of the pipe regions, wherein,
when a first pipe region allocated in the packet buffer corresponding to a first endpoint before the reconstruction processing is allocated again after the reconstruction processing, the data transfer control device performs copy processing in which data is read from the first pipe region before the reconstruction processing and the read data is written into the first pipe region after the reconstruction processing;
a register which stores an initial value of a source address which is a read address of the first pipe region before the reconstruction processing;
a register which stores an initial value of a destination address which is a write address of the first pipe region after the reconstruction processing; and
a register which stores instruction information which instructs to increment or decrement the source address and the destination address.

12. The data transfer control device as defined in claim 11,
controlling a write pointer indicating a write address of data in each of the pipe regions and a read pointer indicating a read address of data in each of the pipe regions; and
performing moving processing of the write pointer and the read pointer of a first pipe region so that the write pointer and the read pointer after the reconstruction processing respectively indicate locations corresponding to the write address and the read address of data in the first pipe region before the reconstruction processing.

13. The data transfer control device as defined in claim 11, comprising:
a state controller which controls a plurality of states including a state of host operation when the data transfer control device operates as a host, and a state of peripheral operation when the data transfer control device operates as a peripheral, wherein:
the transfer controller includes a host controller which transfers data in the host operation, and a peripheral controller which transfers data in the peripheral operation; and
in the host operation, the buffer controller allocates the pipe regions in the packet buffer, and the host controller transfers data between the allocated pipe regions and corresponding endpoints.

14. The data transfer control device as defined in claim 11, performing data transfer conforming to the Universal Serial Bus (USB) On-The-Go (OTG) standard.

15. An electronic instrument comprising:
the data transfer control device as defined in claim 11;
a device which performs output processing, fetch processing, or storage processing of data transferred through the data transfer control device and the bus; and
a processing section which controls data transfer by the data transfer control device.

16. A data transfer control device for data transfer through a bus, the data transfer control device comprising:
a buffer controller which allocates a plurality of pipe regions in a packet buffer and controls access to the allocated packet buffer, each of the pipe regions storing data which is transferred between each of the pipe regions and corresponding one of endpoints; and
a transfer controller which controls data transfer between the pipe region and a corresponding endpoint, wherein:
the data transfer control device performs reconstruction processing which includes at least one of delete processing of the allocated pipe region, addition processing of a new pipe region, and size-change processing of the allocated pipe region; and
when a first pipe region allocated in the packet buffer corresponding to a first endpoint before the reconstruction processing is allocated again after the reconstruction processing, the data transfer control device performs copy processing in which data is read from the first pipe region before the reconstruction processing and the read data is written into the first pipe region after the reconstruction processing, wherein:
when a start address of the first pipe region after the reconstruction processing is greater than a start address of the first pipe region before the reconstruction processing, data is read from the first pipe region before the reconstruction processing while decrementing a source address which is a read address of the first pipe region before the reconstruction processing, and the read data is written into the first pipe region after the reconstruction processing while decrementing a destination address which is a write address of the first pipe region after the reconstruction processing; and
when the start address of the first pipe region after the reconstruction processing is smaller than the start address of the first pipe region before the reconstruction processing, data is read from the first pipe region before the reconstruction processing while incrementing the source address, and the read data is written into the first pipe region after the reconstruction processing while incrementing the destination address.

17. The data transfer control device as defined in claim 16, comprising:
a register section which includes a plurality of transfer condition registers in each of which transfer condition information on data transfer between the pipe region and a corresponding endpoint is set, wherein:
the transfer controller automatically generates a transaction for an endpoint based on the transfer condition information set in one of the transfer condition registers, and automatically transfers data between the pipe region and a corresponding endpoint.

18. The data transfer control device as defined in claim 16, comprising:
a state controller which controls a plurality of states including a state of host operation when the data transfer control device operates as a host, and a state of peripheral operation when the data transfer control device operates as a peripheral, wherein:
the transfer controller includes a host controller which transfers data in the host operation, and a peripheral controller which transfers data in the peripheral operation; and
in the host operation, the buffer controller allocates the pipe regions in the packet buffer, and the host controller transfers data between the allocated pipe regions and corresponding endpoints.

19. The data transfer control device as defined in claim 16, performing data transfer conforming to the Universal Serial Bus (USB) On-The-Go (OTG) standard.

20. An electronic instrument comprising:
the data transfer control device as defined in claim 16;
a device which performs output processing, fetch processing, or storage processing of data transferred through the data transfer control device and the bus; and
a processing section which controls data transfer by the data transfer control device.

21. The data transfer control device as defined in claim 16, controlling a write pointer indicating a write address of data in each of the pipe regions and a read pointer indicating a read address of data in each of the pipe regions; and
performing moving processing of the write pointer and the read pointer of a first pipe region so that the write pointer and the read pointer after the reconstruction processing respectively indicate locations corresponding to the write address and the read address of data in the first pipe region before the reconstruction processing.

22. The data transfer control device as defined in claim 21, comprising:
a register which stores instruction information which instructs switching between:
a mode in which the write pointer and the read pointer are moved so that the write pointer and the read pointer after the reconstruction processing respectively indicate locations corresponding to the write address and the read address of data in the first pipe region before the reconstruction processing; and
a mode in which the write pointer and the read pointer are cleared so that the write pointer and the read pointer respectively indicate the start address and the end address of the first pipe region after the reconstruction processing.

23. The data transfer control device as defined in claim 21, performing the moving processing of the write pointer and the read pointer by converting:
an absolute address and an absolute read address indicated by the write pointer and the read pointer into a relative address and a relative read address on the basis of a start address and an end address of the first pipe region before the reconstruction processing; and
the relative address and the relative read address into the absolute address and the absolute read address based on a start address and an end address of the first pipe region after the reconstruction processing.

24. A data transfer control device for data transfer through a bus, the data transfer control device comprising:
a buffer controller which allocates a plurality of pipe regions in a packet buffer and controls access to the allocated packet buffer, each of the pipe regions storing data which is transferred between each of the pipe regions and corresponding one of endpoints;
a transfer controller which controls data transfer between the pipe region and a corresponding endpoint, wherein:
the data transfer control device performs reconstruction processing which includes at least one of delete processing of the allocated pipe region, addition processing of a new pipe region, and size-change processing of the allocated pipe region; and
when a first pipe region allocated in the packet buffer corresponding to a first endpoint before the reconstruction processing is allocated again after the reconstruction processing, the data transfer control device performs copy processing in which data is read from the first pipe region before the reconstruction processing and the read data is written into the first pipe region after the reconstruction processing;
a reconstruction address generation circuit which generates a source address which is a read address of the first pipe region before the reconstruction processing, generates a destination address which is a write address of the first pipe region after the reconstruction processing, selects one of the source address and the destination address, and outputs a selected address as a reconstruction address;
an address selector which selects one of the reconstruction address from the reconstruction address generation circuit, an access address from the transfer controller, an access address from a processing section which controls the data transfer control device and an access address from an application layer device, and then outputs a selected address to the packet buffer;
a latch circuit which latches data read from the packet buffer; and
a write data selector which selects one of the data latched by the latch circuit, write data from the transfer controller, write data from the processing section and write data from the application layer device, and then outputs a selected data to the packet buffer.

25. A data transfer control device for data transfer through a bus, the data transfer control device comprising:
a buffer controller which allocates a plurality of pipe regions in a packet buffer and controls access to the allocated packet buffer, each of the pipe regions storing data which is transferred between each of the pipe regions and corresponding one of endpoints;
a transfer controller which controls data transfer between the pipe region and a corresponding endpoint, wherein:
the data transfer control device performs reconstruction processing which includes at least one of delete processing of the allocated pipe region, addition processing of a new pipe region, and size-change processing of the allocated pipe region; and
when a first pipe region allocated in the packet buffer corresponding to a first endpoint before the reconstruction processing is allocated again after the reconstruction processing, the data transfer control device performs copy processing in which data is read from the first pipe region before the reconstruction processing and the read data is written into the first pipe region after the reconstruction processing;
a register which stores an initial value of a source address which is a read address of the first pipe region before the reconstruction processing;
a register which stores an initial value of a destination address which is a write address of the first pipe region after the reconstruction processing; and
a register which stores instruction information which instructs to increment or decrement the source address and the destination address.

26. The data transfer control device as defined in claim 25, controlling a write pointer indicating a write address of data in each of the pipe regions and a read pointer indicating a read address of data in each of the pipe regions; and
performing moving processing of the write pointer and the read pointer of a first pipe region so that the write pointer and the read pointer after the reconstruction processing respectively indicate locations corresponding to the write address and the read address of data in the first pipe region before the reconstruction processing.

* * * * *